(12) United States Patent
Noel et al.

(10) Patent No.: US 12,034,758 B2
(45) Date of Patent: Jul. 9, 2024

(54) OPTIMIZING NETWORK MICROSEGMENTATION POLICY FOR CYBER RESILIENCE

(71) Applicant: The MITRE Corporation, McLean, VA (US)

(72) Inventors: Steven Earl Noel, Woodbridge, VA (US); Vipin Swarup, McLean, VA (US); Karin Luisa Johnsgard, Street, MD (US)

(73) Assignee: The MITRE Corporation, McLean, VA (US)

( * ) Notice: Subject to any disclaimer, the term of this patent is extended or adjusted under 35 U.S.C. 154(b) by 332 days.

(21) Appl. No.: 17/474,464

(22) Filed: Sep. 14, 2021

(65) Prior Publication Data
US 2023/0085509 A1    Mar. 16, 2023

(51) Int. Cl.
*H04L 9/40* (2022.01)

(52) U.S. Cl.
CPC ...... *H04L 63/1433* (2013.01); *H04L 63/1416* (2013.01); *H04L 63/145* (2013.01); *H04L 63/20* (2013.01)

(58) Field of Classification Search
CPC ............. H04L 63/1433; H04L 63/1416; H04L 63/145; H04L 63/20
See application file for complete search history.

(56) References Cited

U.S. PATENT DOCUMENTS

| | | | | |
|---|---|---|---|---|
| 8,479,266 B1 * | 7/2013 | Delker | .................... | H04L 63/20 726/4 |
| 8,584,194 B1 * | 11/2013 | Kerr | .................... | H04L 63/1491 709/227 |

(Continued)

FOREIGN PATENT DOCUMENTS

| | | | | |
|---|---|---|---|---|
| CN | 113992355 A | * | 1/2022 | ............. G06F 21/55 |
| FR | 2876855 A1 | * | 4/2006 | ......... H04L 63/0209 |
| WO | WO-2015010218 A1 | * | 1/2015 | ............. G06F 11/00 |

OTHER PUBLICATIONS

Jin, Z. English translation of CN 113992355 A. Jan. 28, 2022. (Year: 2022).*

(Continued)

*Primary Examiner* — Sarah Su
(74) *Attorney, Agent, or Firm* — Morrison & Foerster LLP

(57) ABSTRACT

Described herein is a system and method for improving cyber resilience for determining an optimal security policy for a network. The system uses an objective function to balance cyberattack risks, accessibility to network resources, resource limitations, minimum mission availability requirements within a network environment, or a combination thereof. The objective function comprises objectives (one or more variables that enhance accessibility to network resources and reduce cyberattack risks) and constraints (one or more variables that characterize resource limitations or minimum mission availability requirements within a network environment). The optimal security policy is selected by solving one or more optimization problems. The optimization problem may be solved by determining candidate security policies that meet the constraints and selecting among candidate security policies having the highest score for a given objective function.

20 Claims, 31 Drawing Sheets

(56) References Cited

U.S. PATENT DOCUMENTS

| | | | |
|---|---|---|---|
| 9,218,502 B1* | 12/2015 | Doermann | G06F 21/604 |
| 9,438,634 B1 | 9/2016 | Ross et al. | |
| 10,009,383 B2 | 6/2018 | Woolward | |
| 10,298,619 B2 | 5/2019 | Nimmagadda et al. | |
| 10,375,121 B2 | 8/2019 | Hamou et al. | |
| 2009/0199293 A1* | 8/2009 | Song | H04L 63/20 726/18 |
| 2009/0271862 A1* | 10/2009 | Allen | H04L 63/1416 726/22 |
| 2016/0072899 A1* | 3/2016 | Tung | H04L 41/145 709/223 |
| 2016/0359913 A1* | 12/2016 | Gupta | H04L 43/026 |
| 2018/0139225 A1* | 5/2018 | Zhou | H04L 63/0263 |
| 2019/0312910 A1* | 10/2019 | Convertino | H04L 41/145 |
| 2021/0185077 A1* | 6/2021 | Shavlik | H04L 63/1433 |
| 2021/0352107 A1* | 11/2021 | Monni | H04L 63/20 |
| 2023/0115982 A1* | 4/2023 | Lin | H04L 63/104 726/1 |
| 2023/0139089 A1* | 5/2023 | Park | H04L 63/0236 726/1 |
| 2023/0300032 A1* | 9/2023 | Noel | H04L 41/145 709/223 |

OTHER PUBLICATIONS

Koskinen, J. (2020). Microsegmentation as part of organization's network architecture, Investigating VMware NSX for vSphere. JAMK University of Applied Sciences., pp. 1-89.

Yousefi-Azar et al. "Unsupervised Learning for security of Enterprise networks by micro-segmentation," Cyber Defence Next Generation Technology and Science Conference, Jul. 2020, Brisbane, Queensland, Australia; pp. 1-3.

* cited by examiner

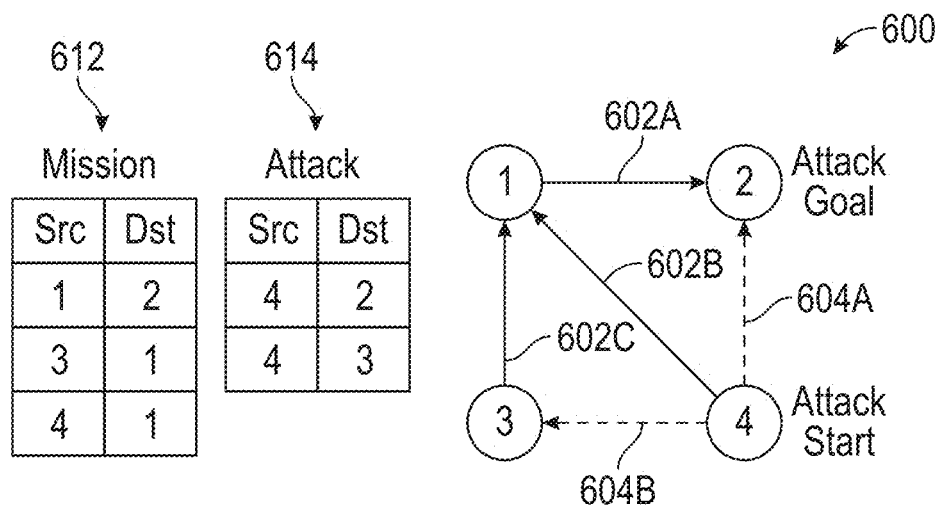
FIG. 6
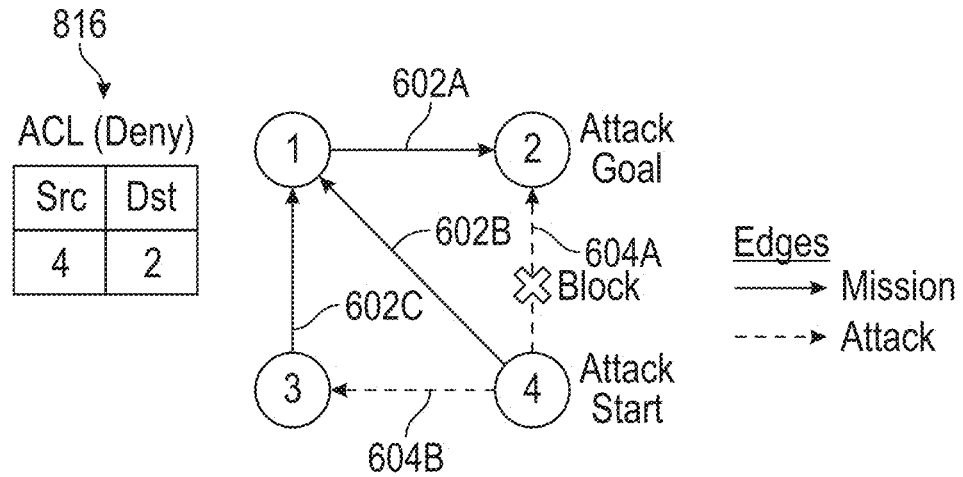
FIG. 7
FIG. 8

| | $p_{1,4}$ | $p_{3,2}$ | $p_{4,2}$ | $p_{4,3}$ | Constraint C1.2 | Objective O1 | |
|---|---|---|---|---|---|---|---|
| 1020A → | 0 | 0 | 0 | 0 | 1 | 4 | Feasible |
| 1020B → | 0 | 0 | 0 | 1 | 1 | 3 | Feasible |
| | 0 | 0 | 1 | 0 | 0 | 3 | Infeasible |
| | 0 | 0 | 1 | 1 | 0 | 2 | Infeasible |
| 1020C → | 0 | 1 | 0 | 0 | 1 | 3 | Feasible |
| | 0 | 1 | 0 | 1 | 0 | 2 | Infeasible |
| | 0 | 1 | 1 | 0 | 0 | 2 | Infeasible |
| | 0 | 1 | 1 | 1 | 0 | 1 | Infeasible |
| 1020D → | 1 | 0 | 0 | 0 | 1 | 3 | Feasible |
| 1020E → | 1 | 0 | 0 | 1 | 1 | 2 | Optimal |
| | 1 | 0 | 1 | 0 | 0 | 2 | Infeasible |
| | 1 | 0 | 1 | 1 | 0 | 1 | Infeasible |
| 1020F → | 1 | 1 | 0 | 0 | 1 | 2 | Optimal |
| | 1 | 1 | 0 | 1 | 0 | 1 | Infeasible |
| | 1 | 1 | 1 | 0 | 0 | 1 | Infeasible |
| | 1 | 1 | 1 | 1 | 0 | 0 | Infeasible |

| Policy (With Host-to-Host Impact) | | | | | Total Mission Impact | # of Blocked Shortest Paths | | | Blocked Edges | |
|---|---|---|---|---|---|---|---|---|---|---|
| $p_{3,1}$ (10) | $p_{3,2}$ (0) | $p_{4,1}$ (5) | $p_{4,2}$ (0) | $p_{4,3}$ (10) | | Length 1 | Length 2 | Length 3 | | |
| 0 | 0 | 0 | 0 | 0 | 25 | 1 | 2 | 1 | 5 | Infeasible |
| 0 | 0 | 0 | 0 | 1 | 15 | 1 | 2 | 1 | 4 | Infeasible |
| 0 | 0 | 0 | 1 | 0 | 25 | 0 | 2 | 1 | 4 | Infeasible |
| 0 | 0 | 0 | 1 | 1 | 15 | 0 | 2 | 1 | 3 | Infeasible |
| 0 | 0 | 1 | 0 | 0 | 20 | 1 | 1 | 1 | 4 | Infeasible |
| 0 | 0 | 1 | 0 | 1 | 10 | 1 | 1 | 1 | 3 | Feasible |
| 0 | 0 | 1 | 1 | 0 | 20 | 0 | 1 | 1 | 3 | Infeasible |
| 0 | 0 | 1 | 1 | 1 | 10 | 0 | 1 | 1 | 2 | Feasible |
| 0 | 1 | 0 | 0 | 0 | 25 | 1 | 2 | 1 | 4 | Infeasible |
| 0 | 1 | 0 | 0 | 1 | 15 | 1 | 2 | 1 | 3 | Infeasible |
| 0 | 1 | 0 | 1 | 0 | 25 | 0 | 2 | 1 | 3 | Infeasible |
| 0 | 1 | 0 | 1 | 1 | 15 | 0 | 2 | 1 | 4 | Infeasible |
| 0 | 1 | 1 | 0 | 0 | 20 | 1 | 1 | 1 | 3 | Infeasible |
| 0 | 1 | 1 | 0 | 1 | 10 | 1 | 1 | 1 | 2 | Feasible |
| 0 | 1 | 1 | 1 | 0 | 20 | 0 | 1 | 1 | 2 | Infeasible |
| 0 | 1 | 1 | 1 | 1 | 10 | 0 | 0 | 1 | 1 | Feasible |

FIG. 14 Continued

| | | | | | | | | | Status |
|---|---|---|---|---|---|---|---|---|---|
| 4 | 1 | 2 | 1 | 15 | 0 | 0 | 0 | 1 | Infeasible |
| 3 | 0 | 2 | 1 | 5 | 1 | 0 | 0 | 1 | *Optimal* |
| 3 | 1 | 2 | 0 | 15 | 0 | 1 | 0 | 1 | Infeasible |
| 2 | 0 | 2 | 0 | 5 | 1 | 1 | 0 | 1 | Feasible |
| 3 | 1 | 1 | 1 | 10 | 0 | 0 | 0 | 1 | Feasible |
| 2 | 0 | 1 | 0 | 0 | 1 | 1 | 0 | 1 | Feasible |
| 2 | 1 | 1 | 0 | 10 | 0 | 1 | 0 | 1 | Feasible |
| 1 | 0 | 1 | 0 | 0 | 1 | 0 | 0 | 1 | Feasible |
| 3 | 1 | 2 | 1 | 15 | 0 | 0 | 1 | 1 | Infeasible |
| 2 | 0 | 1 | 1 | 5 | 1 | 0 | 1 | 1 | Feasible |
| 2 | 1 | 2 | 0 | 15 | 0 | 1 | 1 | 1 | Infeasible |
| 3 | 0 | 1 | 0 | 5 | 1 | 1 | 1 | 1 | Feasible |
| 2 | 1 | 0 | 1 | 10 | 0 | 0 | 1 | 1 | Feasible |
| 1 | 0 | 1 | 0 | 0 | 1 | 0 | 1 | 1 | Feasible |
| 1 | 1 | 0 | 0 | 10 | 0 | 1 | 1 | 1 | Feasible |
| 0 | 0 | 0 | 0 | 0 | 1 | 1 | 1 | 1 | Feasible |

FIG. 18

| Policy (With Host-to-Host Impact) | | | | | Total Mission Impact | Blocked Shortest Paths | | | Blocked Edges | |
|---|---|---|---|---|---|---|---|---|---|---|
| $p_{3,1}$ (10) | $p_{3,2}$ | $p_{4,1}$ (5) | $p_{4,2}$ | $p_{4,3}$ (10) | | Length 1 | Length 2 | Length 3 | | |
| 0 | 0 | 0 | 0 | 0 | 25 | 1 | 2 | 1 | 5 | |
| 0 | 0 | 0 | 0 | 1 | 15 | 1 | 2 | 1 | 4 | |
| 0 | 0 | 0 | 1 | 0 | 25 | 0 | 2 | 1 | 4 | |
| 0 | 0 | 0 | 1 | 1 | 15 | 0 | 2 | 1 | 3 | |
| 0 | 0 | 1 | 0 | 0 | 20 | 1 | 1 | 1 | 4 | |
| 0 | 0 | 1 | 0 | 1 | 10 | 0 | 1 | 1 | 3 | |
| 0 | 0 | 1 | 1 | 0 | 20 | 1 | 2 | 1 | 3 | |
| 0 | 0 | 1 | 1 | 1 | 10 | 0 | 1 | 1 | 2 | |
| 0 | 1 | 0 | 0 | 0 | 25 | 1 | 2 | 1 | 4 | |
| 0 | 1 | 0 | 0 | 1 | 15 | 0 | 1 | 1 | 3 | |
| 0 | 1 | 0 | 1 | 0 | 25 | 0 | 2 | 1 | 3 | |
| 0 | 1 | 0 | 1 | 1 | 15 | 0 | 2 | 1 | 4 | |
| 0 | 1 | 1 | 0 | 0 | 20 | 1 | 1 | 1 | 3 | |
| 0 | 1 | 1 | 0 | 1 | 10 | 0 | 0 | 1 | 2 | |
| 0 | 1 | 1 | 1 | 0 | 20 | 0 | 1 | 1 | 2 | |
| 0 | 1 | 1 | 1 | 1 | 10 | 0 | 0 | 1 | 1 | |
| 1 | 0 | 0 | 0 | 0 | 15 | 1 | 1 | 1 | 4 | |
| 1 | 0 | 0 | 0 | 1 | 5 | 1 | 2 | 0 | 3 | Pareto Front |
| 1 | 0 | 0 | 1 | 0 | 15 | 0 | 2 | 1 | 3 | |
| 1 | 0 | 0 | 1 | 1 | 5 | 0 | 2 | 0 | 2 | Pareto Front |
| 1 | 0 | 1 | 0 | 0 | 10 | 1 | 1 | 1 | 3 | |
| 1 | 0 | 1 | 0 | 1 | 0 | 1 | 1 | 0 | 2 | |
| 1 | 0 | 1 | 1 | 0 | 10 | 0 | 1 | 1 | 2 | |
| 1 | 0 | 1 | 1 | 1 | 0 | 0 | 1 | 0 | 1 | Pareto Front |
| 1 | 1 | 0 | 0 | 0 | 15 | 1 | 2 | 1 | 3 | |
| 1 | 1 | 0 | 0 | 1 | 5 | 1 | 2 | 1 | 2 | |
| 1 | 1 | 0 | 1 | 0 | 15 | 0 | 2 | 1 | 2 | |
| 1 | 1 | 0 | 1 | 1 | 5 | 0 | 1 | 1 | 3 | |
| 1 | 1 | 1 | 0 | 0 | 10 | 1 | 1 | 1 | 2 | |
| 1 | 1 | 1 | 0 | 1 | 0 | 0 | 0 | 1 | 1 | |
| 1 | 1 | 1 | 1 | 0 | 10 | 0 | 0 | 1 | 1 | |
| 1 | 1 | 1 | 1 | 1 | 0 | 0 | 0 | 0 | 0 | |

Mission Accessibility: 100%

75%

62.5%

50%

25%

0%

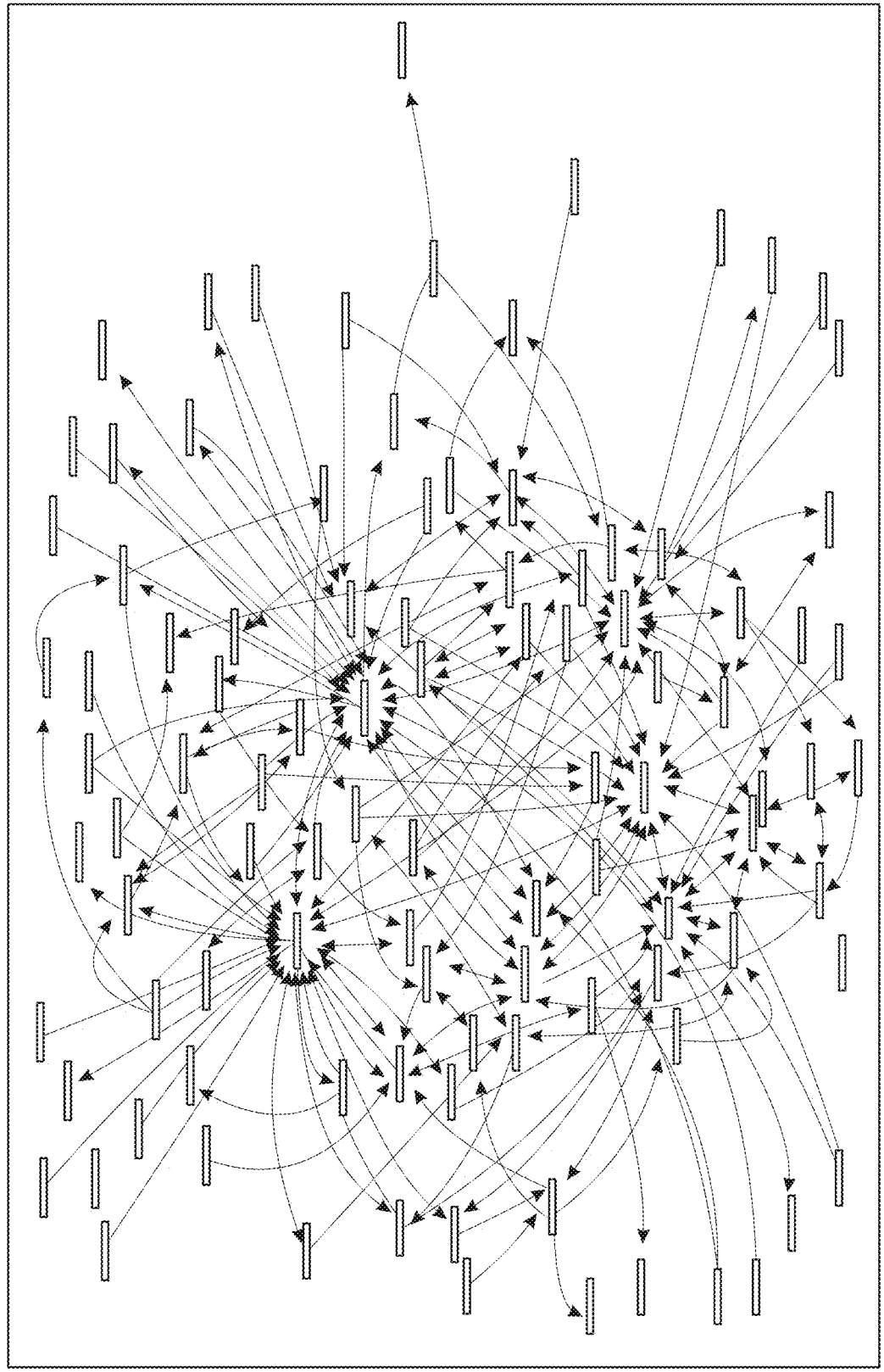

OPTIMIZING NETWORK MICROSEGMENTATION POLICY FOR CYBER RESILIENCE

FIELD OF THE DISCLOSURE

This disclosure relates generally to a system and method for determining an optimal security policy for a network that improves cyberattack risks while balancing accessibility to critical network resources.

BACKGROUND OF THE DISCLOSURE

Effective layering of defenses in cyberspace requires addressing all phases of the cyberattack lifecycle. Given increasingly complex networked systems and advanced threats, there is a growing need for cyber resilience. Cyber resilience may be the ability to continue to operate in spite of ongoing cyberattacks. For optimizing cyber resilience, a key challenge is being able to assess various candidate security policies under particular mission and threat circumstances. A security policy may be a set of plans/rules for protecting an organization from cyberattacks.

The assessment of a security policy may consider not only potential impact from adversarial activities, but also any restricted availability of mission-critical services due to, e.g., security hardening. Security hardening may be a set of security policy rules applied to reduce a network's vulnerability. This is especially true inside network perimeters, since systems and services that can be exploited by adversaries already inside a network may be more critical (compared to outside facing ones) for mission operations. Given indications of likely adversarial avenues of approach (or indicators of actual compromise) and measures of mission criticality for allowed access to network resources, policy rules can be optimized to account for that information.

One method for controlling a security policy for optimal cyber resilience is through network microsegmentation. Microsegmentation is a technique that divides the hosts in a network into segments. This isolates the workload and hosts such that it becomes more difficult for a cyberattack to compromise the entire network. Traditional methods of network segmentation secure traffic in the north-south (outside versus inside) orientation. Microsegmentation provides greater control over east-west (lateral) traffic inside a network. This control over lateral traffic may limit lateral movement by adversaries who have breached perimeter defenses. Microsegmentation may support flexible and adaptive security policy in response to changing mission requirements and threat situations.

What is needed is a method for optimizing a network microsegmentation policy for maximum cyber resilience. What is also needed are methods that find an optimal security policy that balances cyberattack risks, accessibility to network resources, resource limitations, minimum mission availability requirements within a network environment, or a combination thereof.

SUMMARY OF THE DISCLOSURE

A method for providing a security access-control policy to a network is disclosed. The method comprises: defining a model, the model including a plurality of matrices, the plurality of matrices comprising: an attack matrix representing an attacker's accessibility within the network, a mission matrix representing one or more mission availability needs, and a policy rule matrix representing candidate security policy rules; determining one or more objectives and one or more constraints, the one or more objectives being one or more variables that enhance accessibility to network resources and reduce cyberattack risks, and the one or more constraints being one or more variables that characterize resource limitations or minimum mission availability requirements within a network environment; forming an optimization problem using the one or more objectives and the one or more constraints; and solving the optimization problem comprising: determining one or more candidate security policies using the plurality of matrices in the model, wherein the one or more candidate security policies meet the one or more constraints, and selecting the security access-control policy from the one or more candidate security policies, wherein the selection is determined from the one or more candidate security policies that has a highest score in meeting the one or more objectives. Additionally or alternatively, in some embodiments, the defining the model further comprises: determining a hardened attack matrix by applying the policy rule matrix to the attack matrix; determining a hardened mission matrix by applying the policy rule matrix to the mission matrix, wherein the optimization problem is formed using the hardened attack matrix and the hardened mission matrix. Additionally or alternatively, in some embodiments, the one or more objectives comprise an objective to minimize a number of blocked edges in the model. Additionally or alternatively, in some embodiments, the one or more objectives comprise a sub-objective, the sub-objective is to minimize a total weight of one or more blocked mission edges between host pairs in the mission matrix. Additionally or alternatively, in some embodiments, the determining the one or more candidate security policies comprises finding paths in the attack matrix and corresponding paths in the mission matrix. Additionally or alternatively, in some embodiments, the method further comprises: forming an additional optimization problem using one or more additional objectives, wherein the one or more additional objectives comprise an objective to maximize a number of blocked shortest attack paths in the attack matrix. Additionally or alternatively, in some embodiments, the blocked shortest attack paths are from one or more attack start hosts to one or more attack goal hosts. Additionally or alternatively, in some embodiments, an objective of the one or more additional objectives comprises a plurality of sub-objectives, the plurality of sub-objectives includes a sub-objective to minimize a number of blocked edges in the mission matrix. Additionally or alternatively, in some embodiments, an objective of the one or more additional objectives comprises a plurality of sub-objectives, the plurality of sub-objectives includes a first sub-objective, a second sub-objective, and a third sub-objective, wherein the first sub-objective has a first priority, the second sub-objective has a second priority, and the third sub-objective has a third priority, wherein the first priority is higher than the second priority, and the second priority is higher than the third priority. Additionally or alternatively, in some embodiments, the security access-control policy is selected from the sub-objective having both the highest score and the highest priority. Additionally or alternatively, in some embodiments, the security access-control policy is selected from the objective having the highest score. Additionally or alternatively, in some embodiments, the method further comprises: forming an additional optimization problem using one or more additional constraints or objectives, wherein the one or more additional constraints or objectives comprise a constraint or an objective to keep a mission impact within a predetermined budget. Additionally or alternatively, in some embodiments, the plurality of matrices have corresponding plurality of graphs, and edges in the plurality of graphs are assigned weights.

A non-transitory computer readable medium is disclosed. The computer readable medium includes instructions that, when executed, perform a method for providing a security access-control policy to a network, the method comprising: defining a model, the model including a plurality of matrices, the plurality of matrices comprising: an attack matrix representing an attacker's accessibility within the network, a mission matrix representing one or more mission availability need, and a policy rule matrix representing candidate security policy rules; determining one or more objectives and one or more constraints, the one or more objectives being one or more variables that enhance accessibility to network resources and reduce cyberattack risks, and the one or more constraints being one or more variables that characterize resource limitations or minimum mission availability requirements within a network environment; forming an optimization problem using the one or more objectives and the one or more constraints; and solving the optimization problem comprising: determining one or more candidate security policies using the plurality of matrices in the model, wherein the one or more candidate security policies meet the one or more constraints, and selecting the security access-control policy from the one or more candidate security policies, wherein the selection is determined from the one or more candidate security policies that has a highest score in meeting the one or more objectives. Additionally or alternatively, in some embodiments, the one or more objectives comprise a sub-objective, the sub-objective is to minimize a total weight of one or more blocked mission edges between host pairs in the mission matrix. Additionally or alternatively, in some embodiments, the method further comprises: forming an additional optimization problem using one or more additional objectives, wherein the one or more additional objectives comprise an objective to maximize a number of blocked shortest attack paths in the attack matrix. Additionally or alternatively, in some embodiments, an objective of the one or more additional objectives comprises a plurality of sub-objectives, the plurality of sub-objectives including a sub-objective to minimize a number of blocked edges in the mission matrix. Additionally or alternatively, in some embodiments, an objective of the one or more additional objectives comprises a plurality of sub-objectives, the plurality of sub-objectives including a sub-objective to minimize a number of blocked edges in the mission matrix. Additionally or alternatively, in some embodiments, an objective of the one or more additional objectives comprises a plurality of sub-objectives, the plurality of sub-objectives including a first sub-objective, a second sub-objective, and a third sub-objective, wherein the first sub-objective has a first priority, the second sub-objective has a second priority, and the third sub-objective has a third priority, wherein the first priority is higher than the second priority, and the second priority is higher than the third priority. Additionally or alternatively, in some embodiments, the method further comprises: forming an additional optimization problem using one or more additional constraints or objectives, wherein the one or more additional constraints or the one or more additional objectives comprise a constraint or an objective to keep a mission impact within a predetermined budget.

BRIEF DESCRIPTION OF THE FIGURES

FIG. 6 illustrates an exemplary scenario having a plurality of network hosts, according to some embodiments of the disclosure.

FIG. 7 illustrates exemplary outcomes for candidate security policies, according to some embodiments of the disclosure.

FIG. 8 illustrates an exemplary single solution optimal security policy, according to some embodiments of the disclosure.

FIG. 10 illustrates exemplary outcomes for candidate security policies, according to some embodiments of the disclosure.

FIG. 14 illustrates exemplary candidate security policies for an objective with a plurality of sub-objectives, according to some embodiments of the disclosure.

FIG. 18 illustrates exemplary candidate security policies for an objective problem with no mission-impact budget constraint, according to some embodiments of the disclosure.

FIGS. 26A-26C illustrate exemplary traffic flows for a plurality of synthesized network datasets input into the microsegmentation policy optimization, according to some embodiments of the disclosure.

DETAILED DESCRIPTION OF THE DISCLOSURE

Figure 1:
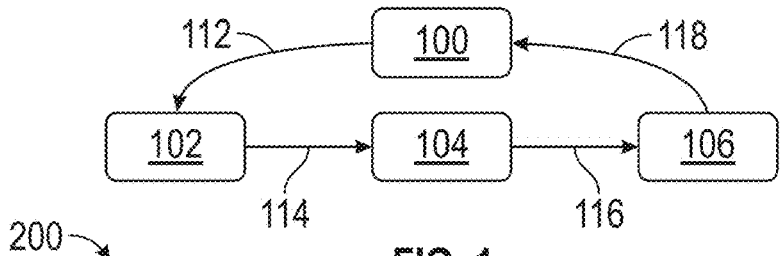
FIG. 1 illustrates a block diagram of an exemplary network, according to some embodiments of the disclosure.

Described herein is a system and method for improving cyber resilience by balancing cyberattack risks, accessibility to network resources, resource limitations, minimum mission availability requirements within a network environment, or a combination thereof, in determining an optimal security policy for a network. The system uses an objective function to achieve this balance. Objectives and constraints are formed, where the objectives are related to the accessibility to network resources and cyberattack risks, and the constraints are related to resource limitations or minimum mission availability requirements within a network environment. The system determines the optimal security policy by selecting among candidate security policies, where the optimal security policy may have the highest score for a given objective function.

In some embodiments, the method comprises determining microsegmentation policy rules that limit adversarial movement within a network. The microsegmentation policy rules may be determined based on assumed threat scenarios and mission availability needs. The objective function may estimate the adversary effort for carrying out a particular attack scenario, balancing it against the extent to which a solution restricts access to mission-critical network resources. Embodiments of the disclosure may include using artificial intelligence to learn these microsegmentation policy rules.

The following description is presented to enable a person of ordinary skill in the art to make and use various embodiments. Descriptions of specific devices, techniques, and applications are provided only as examples. These examples are being provided solely to add context and aid in the understanding of the described examples. It will thus be apparent to a person of ordinary skill in the art that the described examples may be practiced without some or all of the specific details. Other applications are possible, such that the following examples should not be taken as limiting. Various modifications in the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to a person of ordinary skill in the art, that one or more aspects and/or features described or referenced herein may be practiced without some or all of these specific details. In other instances, well-known process steps and/or structures have not been described in detail in order to not obscure some of the aspects and/or features described or referenced herein.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combination of one or more of the associated listed items. It will be further understood that the terms "includes," "including," "comprises," and/or "comprising," when used in this specification, specify the presence of stated features, integers, steps, processes, elements, and/or components, but do not preclude the presence or addition of one or more other features, integers, steps, processes, elements, components, and/or groups thereof Exemplary Overview of a Network FIG. 1 illustrates a block diagram of an exemplary network, according to some embodiments of the disclosure. The network 100 may be configured to communicate with data collector 102 and policy optimizer 106. The data collector 102 may receive data from one or more network sensors (also referred to as sensor outputs 112). The network sensors may monitor data flowing in, out, and through the network 100. Various host and network sensors may forward the data from the network sensor(s) to a central repository, where the data are associated with the types of network sensors. Exemplary types of network sensors include, but are not limited to, network taps, firewall logs, etc.

The data collector 102 may output data 114 to a model builder 104. The model builder 104 may receive the data 114 and map it to a model 116. The model 116 may represent the network environment and mission/threat situation, which is then output to policy optimizer 106. The model 116 may express and enforce policy rules. The model 116 is discussed in more detail below.

The policy optimizer 106 determines an optimal security policy for the network 100. The optimal security policy may be the security policy determined to meet one or more objective functions. The security policy may be a security access-control policy. An objective function may consider both maximum adversary effort and mission availability. The policy optimizer 106 may determine the optimal security policy among candidate security policies. The candidate security policies may take into account multi-step lateral movements through the network 100 according to a particular threat situation. The threat situation may be a presumed or detected adversarial presence in the network 100. Additionally or alternatively, the threat situation may identify mission-critical hosts in the network 100 that are to be prioritized for protection against the adversary.

The policy optimizer 106 may determine candidate security policies from sets of policy rules. In some embodiments, a policy rule may be a microsegmentation policy rule. A microsegmentation policy rule may be one that applies microsegmentation, dividing the hosts in the network 100 into segments. The microsegmentation policy rules may be determined based on assumed threat scenarios and mission availability needs. The assumed threat scenarios and mission availability needs may be represented in the model 116. The policy optimizer 106 may search the sets of policy rules. In some embodiments, the sets of policy rules may be combinatorial, where the policy rules may not be independent of one another. The optimization problem may involve an NP-hard optimization problem, where the search of the sets of policy rules may be used to learn the optimal security policy 118. In this manner, the optimal security policy 118 may be determined based on balancing cyberattack risks and mission availability needs. The policy optimizer 106 is discussed in more detail below.

The optimal security policy 118 may be communicated to the network 100. The network 100 may apply the optimal security policy 118.

Exemplary Determination of Optimal Security Policy

Figure 2:
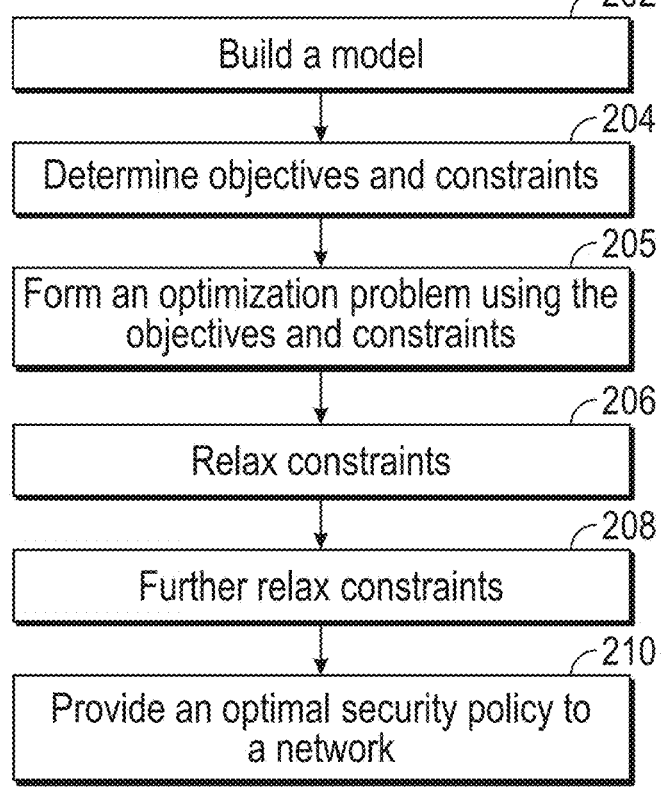
FIG. 2 illustrates a flow chart of an exemplary policy optimization, according to some embodiments of the disclosure.

FIG. 2 illustrates a flow chart of an exemplary process for determining the optimal security policy, according to some embodiments of the disclosure. Process 200 comprises building a model 116 (step 202). The model 116 may be a mathematical model that uses matrices to represent the network environment and mission/threat situation.

In step 204, the objectives and constraints about the problem space are determined. The objectives may define the goals for the optimization. For example, one objective may be to minimize the total number and/or weight of blocked edges in a graph. A blocked edge may be an edge in a graph (e.g., attack graph) where lateral movement may be prohibited. The constraints may be restrictions, such as no attack path (edge in the attack graph) is allowed from a given attack start host to a given attack goal host.

In step 205, an optimization problem may be formed using one or more objectives, one or more constraints, or both. In step 206, the constraints may be relaxed. The constraints may be relaxed to obtain a more realistic and meaningful problem formation, one that balances the cyberattack risks and accessibility to network resources.

The relaxed constraints may be further relaxed in step 208. The further relaxed constraints may represent a mission-impact budget and may yield a multi-objective optimization problem. The multi-objective optimization problem may allow Pareto-optimal tradeoffs between security (reducing one or more attack scenarios) and mission needs (minimizing the impact of blocked services). Each step is discussed in turn below.

In step 210, the system may provide the optimal security policy 118 to the network 100. The optimal security policy 118 may be the optimal solution selected among candidate security policies. The optimal security policy 118 may be result from solving one or more optimization problems.

Exemplary Model

Figure 3:
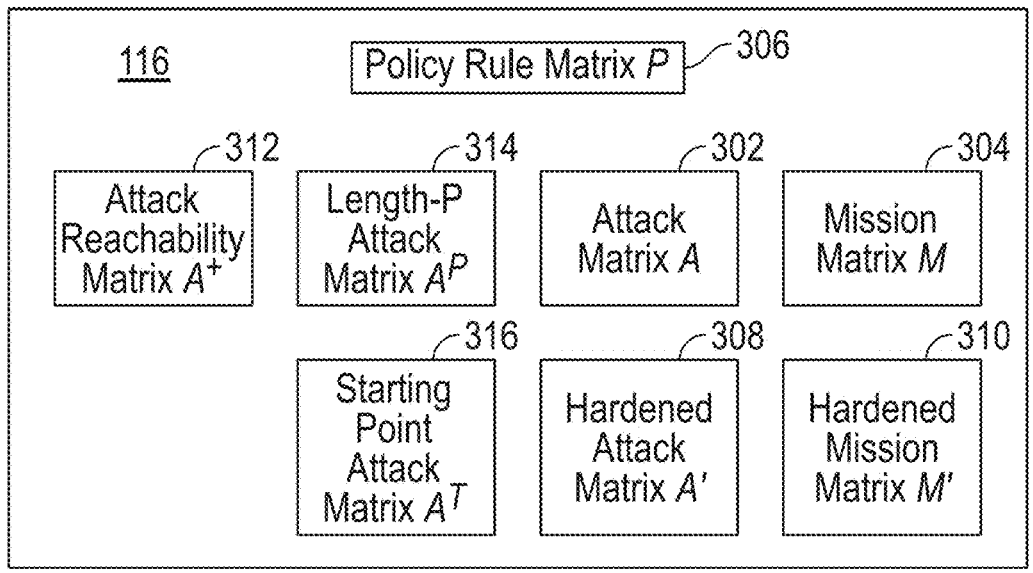
FIG. 3 illustrates an exemplary model, according to some embodiments of the disclosure.

Embodiments of the disclosure include using a model 116 to represent the network environment and mission/threat situation. The model 116 may be a mathematical model that is used by the policy optimizer 106 to determine an optimal security policy. The model 116 may include multiple matrices, as shown in FIG. 3. For each candidate security policy, the matrices represent different types of host-to-host relationships in the network. Exemplary matrices may include an attack matrix A 302 representing an attacker's accessibility, a mission matrix M 304 representing mission availability needs, and a policy rules matrix P 306 representing candidate security policy rules.

The attack matrix A 302 may be an n×n adjacency matrix, where n is the number of hosts in the network 100.

$$A = \begin{bmatrix} a_{1,1} & \cdots & a_{1,n} \\ \vdots & \ddots & \vdots \\ a_{n,1} & \cdots & a_{n,n} \end{bmatrix} \quad (1)$$

An element $a_{i,j}$ in the attack matrix A 302 may represent an attacker's lateral movement within the network from host i to host j.

Figures 4A, 4B, 4C, 4D:
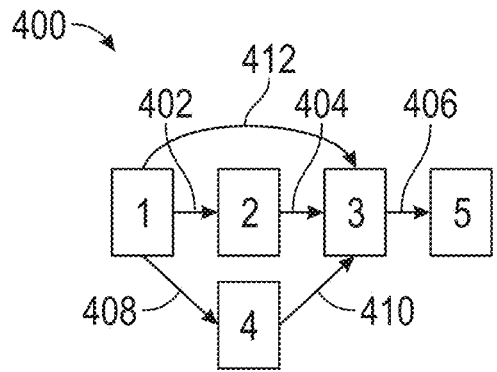
FIG. 4A illustrates an exemplary attack graph, according to some embodiments of the disclosure.
FIGS. 4B-4D illustrate exemplary length-p attack matrices, according to some embodiments of the disclosure.

The matrices in the model 116 may be represented using graphs. FIG. 4A illustrates an exemplary attack graph, and FIG. 4B illustrates a corresponding attack matrix A. The attack matrix A is a length-one attack matrix (described in more detail below).

An attacker may be able to move laterally from host 1 to host 2 via edge 402. This is represented by the element 1 for $a_{1,2}$ in the (length-one) attack matrix A. The attacker may also be able to move laterally from host 1 to host 3 via edge 412, as represented by the element 1 for $a_{1,3}$. Similarly, the attacker may be able to move laterally from host 1 to host 4 via edge 408. The attacker cannot move laterally from host 1 back to host 1 or from host 1 to host 5 using a path length of 1. As a result, the corresponding elements are 0 for $a_{1,1}$ and $a_{1,5}$, respectively. Thus, the first row in the (length-one) attack matrix A (representing movements starting from host 1) is 01110.

The elements of row i of the attack matrix A 302 may indicate outgoing graph edges for host i. The elements of column j of the attack matrix A 302 may indicate incoming graph edges for host j. For example, $a_{1,2}$ being 1 in the attack matrix A 302 means an attacker can move from host 1 to host 2 in the network 100.

Another matrix in the model 116 is the mission matrix M 304, which may be an n×n adjacency matrix, where n is the number of hosts in the network.

$$M = \begin{bmatrix} m_{1,1} & \cdots & m_{1,n} \\ \vdots & \ddots & \vdots \\ m_{n,1} & \cdots & m_{n,n} \end{bmatrix} \quad (2)$$

An element $m_{i,j}$ in the mission matrix M 304 may represent a mission availability need from host i to host j within the network 100. The number 1 may indicate the presence of a mission availability need, or in other words, the mission may need the edge from host i to host j to be available. The number 0 indicates there is no need for the edge to be available. For example, $m_{1,2}$ being 1 in the mission matrix M 304 means there is a mission availability need (the mission needs movement from host i to host j in the network 100 to be available) from host 1 to host 2.

In some embodiments, a policy rule matrix P 306 may represent candidate security policy rules indicating whether access from one host to another host is allowed. The policy rule matrix P may be n×n adjacency matrix, where n is the number of hosts.

$$P = \begin{bmatrix} p_{1,1} & \cdots & p_{1,n} \\ \vdots & \ddots & \vdots \\ p_{n,1} & \cdots & p_{n,n} \end{bmatrix} \quad (3)$$

An element $p_{i,j}$ in the policy rule matrix P 306 may represent accessibility from host i to host j within the network as determined by one or more security policies. If the element is 1, then access is allowed. If the element is 0, then access is denied. For example, $p_{1,2}$ being 1 means movement from host 1 to host 2 is allowed.

The system applies the policy rule matrix P 306 to the attack matrix A 302 to result in a hardened attack matrix A' 308:

$$A' = P \circ A \quad (4)$$

where the ○ symbol denotes the Hadamard (elementwise) product (e.g., $[A \circ B]_{i,j} = [A]_{i,j} [B]_{i,j}$, for all $1 \leq i,j \leq n$). The hardened attack matrix A' 308 indicate host-to-host reachability for an attacker. For example, $a_{1,2}'$ being 1 indicates an attacker's ability to move from host 1 to host 2.

The system applies the policy rule matrix P 306 to the mission matrix M 304 to result in a hardened mission matrix M' 310:

$$M' = P \circ M \quad (5)$$

where the ○ symbol denotes the Hadamard (elementwise) product. The hardened mission matrix M' 310 indicates whether a mission availability need is allowed. For example, $m_{1,2}'$ being 1 means the mission availability need from host 1 to host 2 is allowed.

The system may use the hardened attack matrix A' 308 and hardened mission matrix M' 310 to represent constraints and objectives for the optimization problem. Security hardening may be a set of security policy rules applied to reduce a network's vulnerability. The hardened attack matrix A' 308 may result from applying the security policy rules (expressed in the policy rule matrix P 306) to the attacker's lateral movement (expressed in the attack matrix A 302). The hardened mission matrix M' 310 may result from applying the security policy rules (expressed in the policy rule matrix P 306) to the mission's availability needs (expressed in the mission matrix M 304.)

In some embodiments, an optimal policy rule matrix P" may represent an optimal policy rule indicating whether access from one host to another host is allowed. The system applies the optimal policy rule matrix P" to the attack matrix A to result in a hardened optimal attack matrix A":

$$A'' = P'' \circ A \quad (6)$$

where the symbol denotes the Hadamard (elementwise) product.

The system applies the optimal policy rule matrix P" to the mission matrix M to result in a hardened optimal mission matrix M":

$$M'' = P'' \circ M \quad (7)$$

where the ○ symbol denotes the Hadamard (elementwise) product.

The system determines the existence of attack paths of a given length. The existence of attack paths of a given length may be determined using matrix multiplication. The attack matrix A is multiplied by an integer p number of times to form a length-p attack matrix $A^P$ 314:

$$A^p = A \ldots A \quad (8)$$

where, e.g., $AA = A^2$:

$$[A^2]_{i,j} = \Sigma_k a_{i,k} a_{k,j} \quad (9)$$

The length-one attack matrix $A^1$ represents the attacker's lateral movement for attack paths having a length of one (e.g., host 1 to host 2, host 2 to host 3, etc.). The length-2 attack matrix $A^2$ represents the attacker's lateral movement for attack paths having a length of two (e.g., host 1 to host 3, host 2 to host 5, etc.) The length-3 attack matrix $A^3$ represents the attacker's lateral movement for attack paths having a length of three (e.g., host 1 to host 5, etc.) In some embodiments, the length of a path may be equal to the number of edges in the path.

FIGS. 4B-4D illustrate exemplary corresponding length-p attack matrices (length-one attack matrix A, length-two attack matrix $A^2$, and length-three attack matrix $A^3$), according to some embodiments of the disclosure. The attack graph 400 (shown in FIG. 4A) may comprise a plurality of hosts (host 1, host 2, host 3, host 4, and host 5) and a plurality of edges (edges 402, 404, 406, 408, 410, and 412).

The attacker may also be able to move laterally within the network using path lengths of two. For example, as represented by the element 2 for $a_{1,3}$ in the length-two attack matrix $A^2$, there are two paths having a path length of two for the attacker to move from host 1 to host 3. The first is using edges 402 and 404, and the second is using edges 408 and 410. For $a_{1,5}$ (being 1 in the length-two attack matrix $A^2$), there is one path, edge 412 and edge 406, having a path length of two from host 1 to host 5.

The length-three attack matrix $A^3$ shows there are two paths having a path length of three: (1) edge 402 to edge 404 to edge 406, and (2) edge 408 to edge 410 to edge 406. Both paths are from host 1 to host 5.

The system may determine the attack reachability, which may be represented by an attack reachability matrix $A^+$ 312. The attack reachability matrix $A^+$ 312 may indicate whether a given host is reachable from another host. In some embodiments, the reachability may be through any path length. The attack reachability matrix $A^+$ 312 may be determined using the transitive closure of an attack matrix A:

$$A^+ = A + A^2 + \ldots A^{n-1} \quad (10)$$

where each matrix power $A^p$ may be determined using Boolean matrix multiplication:

$$[A^2]_{i,j} = V_k a_{i,k} \wedge a_{k,j} \quad (11)$$

where the $\wedge$ symbol denotes conjunction (logical AND) and the symbol V denotes disjunction (logical OR). The Boolean matrix multiplication and transitive closure may represent the presence of paths between a given pair of hosts, and the multiplied attack matrix represents the number of paths between a given pair of hosts. For example, the element $a_{i,j}^+$ of the attack reachability matrix $A^+$ represents reachability (through any path length) from host i to host j, wherein 1 indicates presence and 0 represents absence. For example, $a_{1,2}^+$ being 1 means an attacker may reach host 2 from host 1, whereas $a_{1,3}^+$ means the attacker cannot reach host 3 from host 1.

The system may determine a starting point attack matrix $A^T$. The starting point attack matrix $A^T$ 316 may represent attack paths from each attack start host. The attack start host is a host where the attack path starts. The starting point attack matrix $A^T$ 316 may be determined by transposing the attack matrix A:

$$[A^T]_{i,j} = [A]_{j,i} \quad (12)$$

The elements of row i of the starting point attack matrix $A^T$ may indicate incoming graph edges for host i. The elements of column j of the starting point attack matrix $A^T$ may indicate outgoing graph edges for host j.

The system may determine an attack start host vector $h_{start}$. The attack start host vector may be an n×1 column vector, where $h_{start,i}=1$ for host i as an attack start host, and $h_{start,i}=0$ otherwise.

When the starting point attack matrix $A^T$ is multiplied by the attack start host vector $h_{start}$, the elements of the columns (outgoing edges) for each row of the starting point attack matrix $A^T$ may align with elements of the row of the attack start host vector $h_{start}$. The multiplication of the starting point attack matrix $A^T$ and the attack start host vector $h_{start}$ may result in the attack end host vector $h_{end}$.

$$A^T h_{start} = h_{end} \quad (13)$$

The start host attack vector $h_{end}$ may by an n×1 column vector that represents reachability from each attack start host. If $h_{end,j}=1$, then host j is reachable from the attack start host(s) i having $h_{start,i}=1$. If $h_{end,j}=0$, then host j is not reachable from the attack start host(s).

The system may determine an attack goal host vector $h_{goal}$. The attack goal host vector may be an n×1 column vector, where $h_{goal,i}=1$ for host i as an attack goal host, and $h_{goal,i}=0$ otherwise. The attack goal host is a host where the attack path ends. The number of direct path attacks (path length of one) $k_{start\_goal}$ may be determined based on the starting point attack matrix $A^T$, attack start host vector $h_{start}$, and attack goal host vector $h_{goal}$.

$$(A^T h_{start})^T h_{goal} = k_{start\_goal} \quad (14)$$

The number of attack paths of a given length p (from start to goal) may be determined based on the length-p attack matrix $A^P$ 314, attack start host vector $h_{start}$, and attack goal host vector $h_{goal}$.

$$[(A^P)^T h_{start}]^T h_{goal} = k_{start\_goal\_p} \quad (15)$$

The number of path attacks for any given length (from start to goal) may be determined using an attack reachability matrix $A^+$ 312.

$$[(A^+)^T h_{start}]^T h_{goal} = k_{start\_goal\_+} \quad (16)$$

The number of path attacks for any given length using a hardened attack reachability matrix $A'^+$ may be determined.

$$[(A'^+)^T h_{start}]^T h_{goal} = k_{start\_goal\_+} \quad (17)$$

In some embodiments, one or more candidate security policies may be infeasible. A security policy may be infeasible due to not obeying constraints, for example. In some embodiments, certain security policies may operate on certain security policy rules in a certain way. A security settings vector C may represent a particular element $c_k$ or a set of elements of the policy rule matrix P. The security settings vector C may be a 1×q vector.

Figure 5:
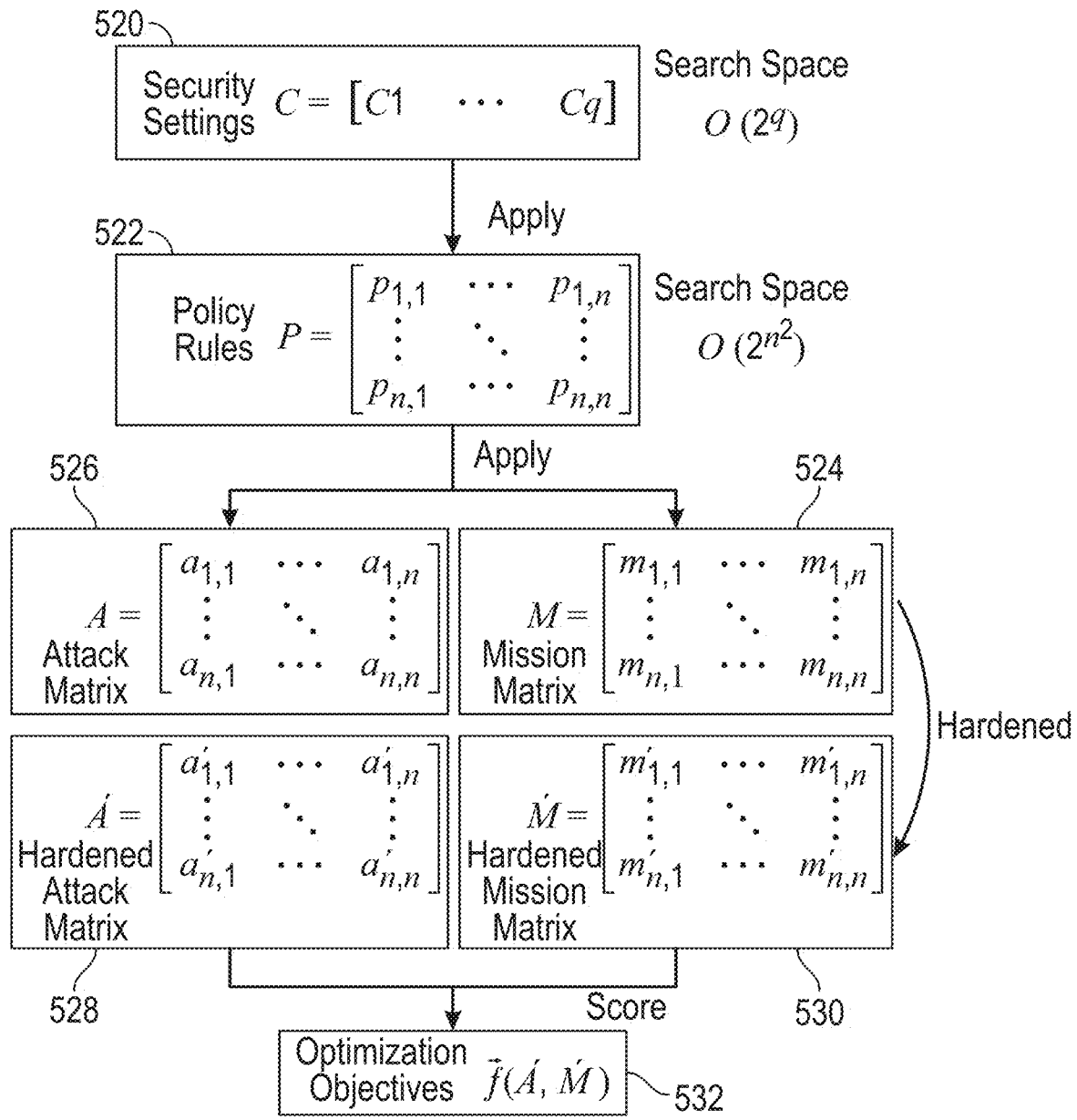
FIG. 5 illustrates a block diagram of exemplary relationships between matrices of a model, according to some embodiments of the disclosure.

FIG. 5 illustrates a diagram of exemplary relationships between the matrices of the model, according to some embodiments of the disclosure. The security settings vector C 520 may be used to determine the policy rules matrix P 522. In some embodiments, the search space for the security settings vector C may be $O(2^q)$, where q represents the number of elements (rules) in the security settings vector C.

In some embodiments, the search space for the policy rules matrix P 522 may be $O(2^{n^2})$, where n represents the number of hosts in the network. In some embodiments, $q<n^2$, so the search space $O(2^q)$ for security settings 520 may be smaller than the search space $O(2^{n^2})$ for policy rules 522.

An algorithm is used to solve the optimization problem by searching the search space $O(2^q)$ for security settings. The result is a given combination of security settings as candidate security policies. The candidate combination of security settings may be used to determine the policy rules matrix P.

The policy rules matrix P may be applied to determine the attack matrix A 526 and mission matrix M 524, according to (1) and (2), above. The hardened attack matrix A' 528 and the hardened mission matrix M' 530 are determined according to (4) and (5), above.

The objective function $f(A', M')$ 532 (discussed in more detail below) may be determined using the hardened attack matrix A' 528 and the hardened mission matrix M' 530. The objective function $f(A', M')$ 532 may represent one or more values that are optimized based on the matrices of the model. In some embodiments, one or more objectives, one or more constraints, or both may be determined from the hardened attack matrix A' 528 or the hardened mission matrix M' 530, or both.

The algorithm then evaluates the objective function $f(A', M')$ 532 and tests whether the objective(s) and constraint(s) are met. Those security policies that meet the objective(s) and constraint(s) are referred to as candidate security policies. The optimal security policy is then selected among the candidate security policies.

Exemplary Objectives and Constraints

As discussed above, embodiments of the disclosure include methods for finding an optimal security policy that balances cyberattack risks and accessibility to network resources. This balance is achieved by solving an optimization problem. The optimization problem may be to optimize an objective function. The results from the optimization may be an optimal security policy. The objective function may use objectives, constraints, or both. The one or more objectives may be one or more variables that enhance accessibility to network resources and reduce cyberattack risks, while the one or more constraints may be one or more variables that characterize resource limitations or minimum mission availability requirements within a network environment. By considering both objectives and constraints for optimizing the objective function, the resulting optimal security policy may be tailored towards an organization's specific network accessibility needs and/or mission requirements. The disclosed methods are thus more flexible than traditional methods.

In some embodiments, the optimal security policy may be determined by solving a plurality of optimization problems. The plurality of optimization problems may use different levels of objectives and constraints. For example, a first optimization problem may use a first objectives and/or constraints, a second optimization problem may use a second objectives and/or constraints, and a third optimization problem may use a third objectives and/or constraints. In some embodiments, the third objectives and/or constraints may be more relaxed than the second objectives and/or constraints. In some embodiments, the second objectives and/or constraints may be more relaxed than the first objectives and/or constraints.

Referring back to FIG. 2, the first objectives and/or constraints may be used in step 205, the second objectives and/or constraints may be used in step 206, and the third objectives and/or constraints may be used in step 208, as one non-limiting example. Embodiments of the disclosure may include using less than all optimization problems, objectives, constraints, or a combination thereof. Although the disclosure describes the optimization problems as "first optimization problem," "second optimization problem," "third optimization problem," and "additional optimization problem," embodiments of the disclosure may include any number of optimization problems, and may refer to any of the described optimization problems. The use of the term "first optimization problem" does not imply that there must be a "second optimization problem" or "third optimization." Additionally or alternatively, the optimization problems may be performed in any order. As one example, if the third optimization problem (the most relaxed) results in a cyber-attack risk that is too high, the second optimization problem may be solved.

An exemplary objective may be to minimize the total number of blocked edges in the optimal security policy, for example. Another exemplary objective may be to minimize the total weight of one or more blocked mission edges between host pairs in the mission matrix. In some embodiments, the constraints may initially be a set of ideal assumptions, which may be to block attack paths while not blocking mission edges. In meeting the objective function (minimizing the total number of blocked edges or total weight of blocked mission edges between host pairs), it may be optimal to comply with the constraints (blocking attack paths while not blocking mission edges). A path may be a sequence of alternating hosts and edges, with no repeated hosts or edges.

The objective function may be stated as a function of a first objective O1 and a plurality of constraints: a first constraint C1.1 and a second constraint C1.2. More specifically, in some embodiments, the first objective O1 may be to minimize the number of blocked edges in the mission graph. The first constraint C1.1 may be there is no edge in the mission graph (referred to as a mission edge) that is blocked. The hardened mission matrix M' 310 may be used to determine whether or not a mission edge is blocked. A mission edge is blocked if it has a value of 0 in the hardened mission matrix M' 310, or not blocked if it has a value of 1.

The second constraint C1.2 may be that path(s) in the attack graph (referred to as an attack path(s)) from the attack start host to the attack goal host are blocked. The hardened attack matrix A' 308 may be used to determine whether or not an attack path, and corresponding attack edges, is blocked. An attack edge is blocked if it has a value of 0 in the hardened attack matrix A' 308, or not blocked if it has a value of 1. An attack path is blocked if all attack edges in the attack path are blocked.

The objective O1 may be stated as minimizing the number of blocked edges ($p_{i,j}$=0) in the policy rules matrix P, which also means maximizing unblocked edges for which $p_{i,j}$=1. The objective O1 may be stated as:

$$O1: \max_P \sum_{i,j} p_{i,j} \qquad (18)$$

The first constraint C1.1 (no mission edge is blocked) may be met while also meeting the second constraint C1.2 (block all attack paths). The first constraint C1.1 and the second constraint C1.2 may be stated as:

$$C1.1: m_{i,j}==1 \Rightarrow p_{i,j}=1 \qquad (19)$$

$$C1.2: \nexists\ a'_{start} \to a'_{goal} \qquad (20)$$

In some embodiments, under constraint C1.1, all mission edges are allowed via the policy rules matrix P. For constraint C1.2, the arrow denotes the existence of a path from host $a_{start}$ to host $a_{goal}$ in the hardened attack graph.

Exemplary Single Optimal Security Policy to the First Optimization Problem

The first optimization problem may result in a single optimal security policy, or multiple optimal security policies that yield the same score for the objective function. The multiple optimal security policies embodiment is discussed in more detail below.

To solve the optimization problem, one or more candidate security policies may be determined using the plurality of matrices in the model (e.g., step 202 of FIG. 2). The candidate security policies may be determined based on feasible path(s). A feasible path is one that does not violate any constraints and begins from the attack start host and ends at the attack goal host.

One or more optimal security policies may be selected from the candidate security policies. The selection may involve determining which of the one or more candidate security policies has the highest score (e.g., highest value for the objective(s)). The selection may result in one candidate security policy as having the highest score. An example is used below to illustrate an optimization problem resulting in a single optimal security policy.

FIG. 6 illustrates an exemplary scenario having four network hosts, according to some embodiments of the disclosure. Graph 600 may be a combined graph, having edges that represent either attack edges or mission edges. The solid arrows may represent mission edges 602, and the dashed arrows may represent attack edges 604. The graph nodes 1, 2, 3, and 4 represent the four network hosts. There may be two attack edges 604A and 604B and three mission edges 602A, 602B, and 602C, for example. The source and destination hosts for each edge may be listed in a mission adjacency list 612 or an attack adjacency list 614. An adjacency list comprises the edges in a given graph.

In the example, host 4 represents the attack start host $a'_{start}$, and host 2 represents that attack goal host $a'_{goal}$. Thus, the attack begins at host 4 and ends at host 2.

The attack matrix A 302 for the attack graph shown in the figure may be:

$$A = \begin{bmatrix} 0 & 0 & 0 & 0 \\ 0 & 0 & 0 & 0 \\ 0 & 0 & 0 & 0 \\ 0 & 1 & 1 & 0 \end{bmatrix} \qquad (21)$$

which shows that the attack edge 604A ($a_{4,2}$ equal to 1 in the attack matrix A 302) from host 4 to host 2 and the attack edge 604B ($a_{4,3}$ equal to 1 in the attack matrix A 302) from host 4 to host 3 are blocked. These blocked attack edges 604 are listed in in the attack adjacency list 614.

The mission matrix M 304 for the mission graph shown in the figure may be:

$$M = \begin{bmatrix} 0 & 1 & 0 & 0 \\ 0 & 0 & 0 & 0 \\ 1 & 0 & 0 & 0 \\ 1 & 0 & 0 & 0 \end{bmatrix} \qquad (22)$$

which shows that the mission edge 602A ($a_{1,2}$ equal to 1 in the mission matrix M 304) from host 1 to host 2, the mission edge 602C ($a_{3,1}$ equal to 1 in the mission matrix M 304) from host 3 to host 1, and the mission edge 602B ($a_{4,1}$ equal to 1 in the mission matrix M 304) from host 4 to host 1 are not blocked. These unblocked mission edges 602 are listed in the mission adjacency list 612.

Each candidate security policy has a policy rules graph P. The constraints are reflected in the policy rules graph P. For the example shown in FIG. 6, the blocked attack edges 604A

($a_{4,2}$) and 604B ($a_{4,3}$) satisfy the second constraint C1.2. The corresponding policy edges are $p_{4,2}$ and $p_{4,3}$, respectively. Unblocked attack edges have corresponding unblocked edges in each candidate policy rules graph P.

Taking these constraints into consideration:

$$P = \begin{bmatrix} 0 & 1 & 1 & 1 \\ 1 & 0 & 1 & 1 \\ 1 & 1 & 0 & 1 \\ 1 & p4,2 & p4,3 & 0 \end{bmatrix} \quad (23)$$

The number of potential security policies to be considered in solving the optimization problem may be equal to $2^{pa}$ where pa is the number of potential attacks. In the example, there are $2^2=4$ potential security policies (binary values of $p_{4,2}$ and $p_{4,3}$) to be considered in solving the optimization problem.

Embodiments of the disclosure may include determining which paths are feasible. The system may determine feasibility by finding paths in the attack matrix A, which represents direct length-one paths (discussed above), and the corresponding path in the mission matrix M. The value $a_{4,2}=1$ in the attack matrix A of (21) indicates there is a direct attack path from host 4 to host 2. The optimal policy rules must block that length0one attack, which is feasible since the mission edge $m_{4,2}=0$.

There may be other paths which could lead from the attack start host 4 to the attack goal host 2. The system may analyze the paths in the length-p attack matrices $A^2$, $A^3$, etc., which represent paths having lengths greater than one (discussed above). Length-p attack matrices $A^2$, $A^3$, etc. may be used to determine the paths having length-two, length-three, etc. In this example, $A^2=A^3=0$, so there are no paths of length two or three (assuming no cycles).

In some embodiments, some attack graph edges (e.g., $a_{4,3}$) may not be on any path of any length from the attack start host (host 4) to the attack goal host (host 2). There may not be any mission edges from the attack start host (host 4) to another host (e.g., host 3, represented by $m_{4,3}=0$). The optimization problem may seek to minimize the number of blocked edges, and the optimal policy rules P' may include a corresponding blocked edge (e.g., $p_{4,3}=1$).

FIG. 7 summarizes exemplary optimization outcomes for each candidate security policy in the example instance, according to some embodiments of the disclosure. For each candidate security policy, the table provides the truth value for Objective O1 (the number of blocked edges) and Constraint C1.2 (no attack path from host 4 to host 2). In each case, Constraint C1.1 (no mission host pair is blocked) is satisfied since $p_{4,2}$ and $p_{4,3}$ are independent of the mission edges. As shown, there are four potential security policies 620A, 620B, 620C, and 620C.

In some embodiments, one or more potential security policies may not be candidate security policies because of being infeasible, e.g., for violating a constraint. For example, the potential security policies 620C (having $p_{4,2}=1$ and $p_{4,3}=0$) and 620D (having $p_{4,2}=1$ and $p_{4,3}=1$) are infeasible because they violate Constraint C1.2. These potential security policies allow for an attack path from the attack start host 4 to the attack goal host 2.

One or more potential security policies may be feasible. For example, the potential security policies 620A (having $p_{4,2}=0$ and $p_{4,3}=0$) and 620B (having $p_{4,2}=0$ and $p_{4,3}=1$) are feasible. The optimal security policy may be determined based on the one having the fewest number of blocked mission edges. For example, among the candidate security policies, the candidate security policy 620B may be the optimal security policy because it blocks only one mission edge from host 4 to host 2, whereas the candidate security policy 620A may be the non-optimal security policy because it blocks two mission edges (lower network accessibility).

FIG. 8 illustrates an exemplary optimal security policy for the above described example network, according to some embodiments of the disclosure. As shown in the figure, the attack edge from host 4 to host 2 is blocked. The figure illustrates an access control list 816 that reflects this blocked attack edge. The access control list may be implemented as an "allow by default" setting.

Exemplary Multiple Solutions to the First Optimization Problem

The optimization problem may result in multiple optimal security policies. In some embodiments, one of the multiple optimal security policies may be selected as the optimal security policy 118 sent to the network 100 (discussed above).

Figure 9:
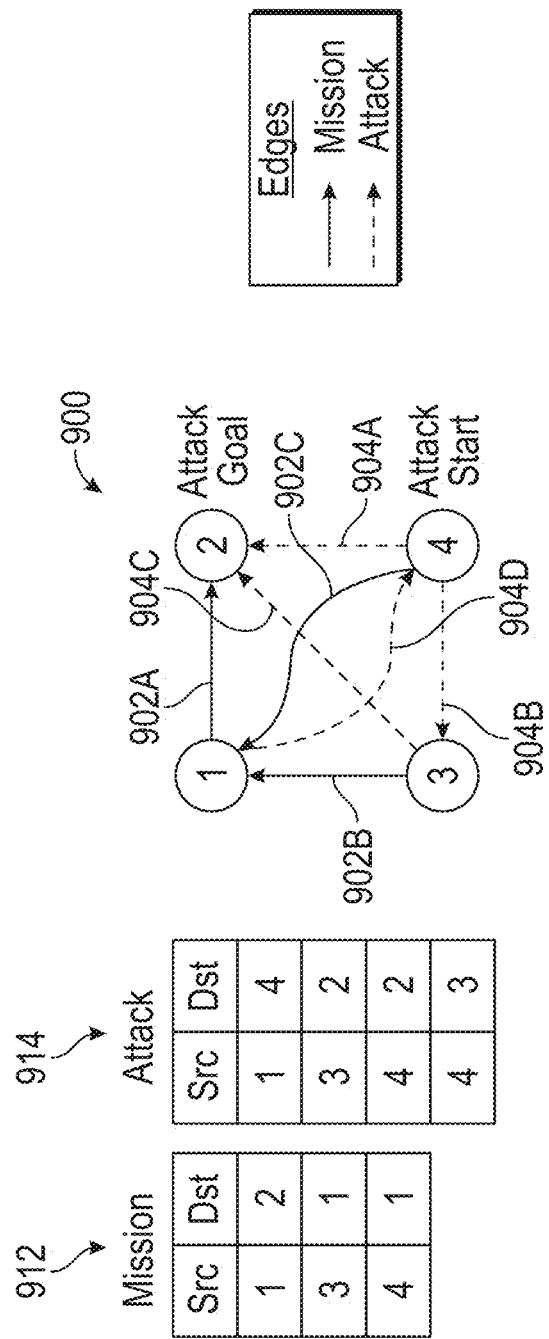
FIG. 9 illustrates an exemplary scenario having a plurality of network hosts, according to some embodiments of the disclosure.

FIG. 9 illustrates an exemplary scenario having four network hosts, according to some embodiments of the disclosure. Graph 900 may be a combined graph, having edges that represent either attack edges or mission edges. The solid arrows may represent mission edges 902, and the dashed arrows may represent attack edges 904. The graph nodes 1, 2, 3, and 4 represent the four network hosts. There may be four attack edges 904A, 904B, 904C, and 904D and three mission edges 902A, 902B, and 902C, for example. The source and destination hosts for each edge may be listed in a mission adjacency list 912 or an attack adjacency list 914.

In the example, host 4 represents the attack start host $a'_{start}$, and host 2 represents that attack goal host $a'_{goal}$. Thus, the attack begins at host 4 and ends at host 2.

The attack matrix A 302 may be:

$$A = \begin{bmatrix} 0 & 0 & 0 & 1 \\ 0 & 0 & 0 & 0 \\ 0 & 1 & 0 & 0 \\ 0 & 1 & 1 & 0 \end{bmatrix} \quad (24)$$

which shows that the attack edge 904A ($a_{4,2}$ equal to 1 in the attack matrix A 302) from host 4 to host 2, the attack edge 904B ($a_{4,3}$ equal to 1 in the attack matrix A 302) from host 4 to host 3, the attack edge 904C ($a_{3,2}$ equal to 1 in the attack matrix A 302) from host 3 to host 2, and the attack edge 904D ($a_{1,4}$ equal to 1 in the attack matrix A 302) from host 1 to host 4 are blocked. These blocked attack edges 904 are listed in in the attack adjacency list 914.

The mission matrix M 304 may be:

$$M = \begin{bmatrix} 0 & 1 & 0 & 0 \\ 0 & 0 & 0 & 0 \\ 1 & 0 & 0 & 0 \\ 1 & 0 & 0 & 0 \end{bmatrix} \quad (25)$$

which shows that the mission edge 902A ($a_{1,2}$ equal to 1 in the mission matrix M 304) from host 1 to host 2, the mission edge 902B ($a_{3,1}$ equal to 1 in the mission matrix M 304) from host 3 to host 1, and the mission edge 902C ($a_{4,1}$ equal to 1 in the mission matrix M 304) from host 4 to host 1 are not blocked. These unblocked mission edges 902 are listed in the mission adjacency list 912.

For the example shown in FIG. 9, the blocked attack edges 904A ($a_{4,2}$), 904B ($a_{4,3}$), 904C ($a_{3,2}$), and 904D ($a_{1,4}$) have corresponding policy edges $p_{4,2}$, $p_{4,3}$, $p_{3,2}$, and $p_{1,4}$, respectively.

The policy rules matrix P is:

$$P = \begin{bmatrix} 1 & 0 & 1 & 1 \\ 1 & 1 & 0 & 1 \\ 0 & 1 & p_{3,2} & p_{1,4} \\ 1 & p_{4,2} & p_{4,3} & 0 \end{bmatrix} \quad (26)$$

In the example, there are $2^4=16$ potential security policies (binary values of $p_{4,2}$, $p_{4,3}$, $p_{3,2}$, and $p_{1,4}$) to be considered in solving the optimization problem.

The attack start host vector $h_{start}$ and attack end host vector hens may be determined.

$$h_{start} = \begin{bmatrix} 0 \\ 0 \\ 0 \\ 1 \end{bmatrix} \quad (27)$$

$$(A)^T h_{start} = h_{end} = \begin{bmatrix} 0 & 0 & 0 & 0 \\ 0 & 0 & 1 & 1 \\ 0 & 0 & 0 & 1 \\ 1 & 0 & 0 & 0 \end{bmatrix} \begin{bmatrix} 0 \\ 0 \\ 0 \\ 1 \end{bmatrix} = \begin{bmatrix} 0 \\ 1 \\ 1 \\ 0 \end{bmatrix} \quad (28)$$

The attack end host vector $h_{end}$ in (28) indicates that there are two length-one attack paths starting from host 4, one ending at host 2 (attack edge 904A) and the other ending at host 3 (attack edge 904B).

The length-two attack matrix $A^2$ may be:

$$A^2 = \begin{bmatrix} 0 & 1 & 1 & 0 \\ 0 & 0 & 0 & 0 \\ 0 & 0 & 0 & 0 \\ 0 & 1 & 0 & 0 \end{bmatrix} \quad (29)$$

The attack end host vector $h_{end}$ may be:

$$(A^2)^T h_{start} = h_{end} = \begin{bmatrix} 0 & 0 & 0 & 0 \\ 1 & 0 & 0 & 1 \\ 1 & 0 & 0 & 0 \\ 0 & 0 & 0 & 0 \end{bmatrix} \begin{bmatrix} 0 \\ 0 \\ 0 \\ 1 \end{bmatrix} = \begin{bmatrix} 0 \\ 1 \\ 0 \\ 0 \end{bmatrix} \quad (30)$$

There is one length-two attack path (comprising attack edges 904B and 904C) that starts at host 4 and ends at host 2. The length-three attack matrix $A^3$ (not shown) indicates there is no length-three attack path that starts at host 4.

The system may determine the attack reachability matrix $A^+$ 312, which represents the binary reachability through paths of any length for the attack matrix A:

$$A^+ = A + A^2 = \begin{bmatrix} 0 & 0 & 0 & 1 \\ 0 & 0 & 0 & 0 \\ 0 & 1 & 0 & 0 \\ 0 & 1 & 1 & 0 \end{bmatrix} + \begin{bmatrix} 0 & 1 & 1 & 0 \\ 0 & 0 & 0 & 0 \\ 0 & 0 & 0 & 0 \\ 0 & 1 & 0 & 0 \end{bmatrix} = \begin{bmatrix} 0 & 1 & 1 & 0 \\ 0 & 0 & 0 & 0 \\ 0 & 1 & 0 & 0 \\ 0 & 1 & 1 & 0 \end{bmatrix} \quad (31)$$

The attack reachability for the hardened attack matrix A' 308 for a potential security policies may be determined.

$$(A'^+)^T h_{start} = ([P \circ A]^+)^T h_{start} = h_{end} \quad (32)$$

$$= \left( \begin{bmatrix} \begin{bmatrix} 0 & 1 & 1 & 0 \\ 1 & 0 & 1 & 1 \\ 1 & 0 & 0 & 1 \\ 1 & 0 & 0 & 0 \end{bmatrix} \circ \begin{bmatrix} 0 & 0 & 0 & 1 \\ 0 & 0 & 0 & 0 \\ 0 & 1 & 0 & 0 \\ 0 & 1 & 1 & 0 \end{bmatrix} \end{bmatrix}^+ \right)^T \begin{bmatrix} 0 \\ 0 \\ 0 \\ 1 \end{bmatrix}$$

$$= \left( \begin{bmatrix} 0 & 0 & 0 & 0 \\ 0 & 0 & 0 & 0 \\ 0 & 0 & 0 & 0 \\ 0 & 0 & 0 & 0 \end{bmatrix}^+ \right)^T \begin{bmatrix} 0 \\ 0 \\ 0 \\ 1 \end{bmatrix}$$

FIG. 10 summarizes exemplary optimization outcomes for each potential security policy in the example instance, according to some embodiments of the disclosure. The table provides the truth value for Constraint C1.2 (no attack path from host 4 to host 2) and Objective O1 (the number of blocked edges). In each case, Constraint C1.1 (no mission host pair is blocked) is true since $p_{4,2}$, $p_{4,3}$, $p_{3,2}$, and $p_{1,4}$ are independent of the mission edges. As shown in the table, there are six feasible candidate security policies 1020A-1020F, two of which (1020E and 1020F) are considered optimal. The optimal candidate security policies 1020E and 1020F have the lowest number of blocked edges (shown in the Objective O1 column) compared to the non-optimal candidate security policies 1020A-1020D.

Figure 11:
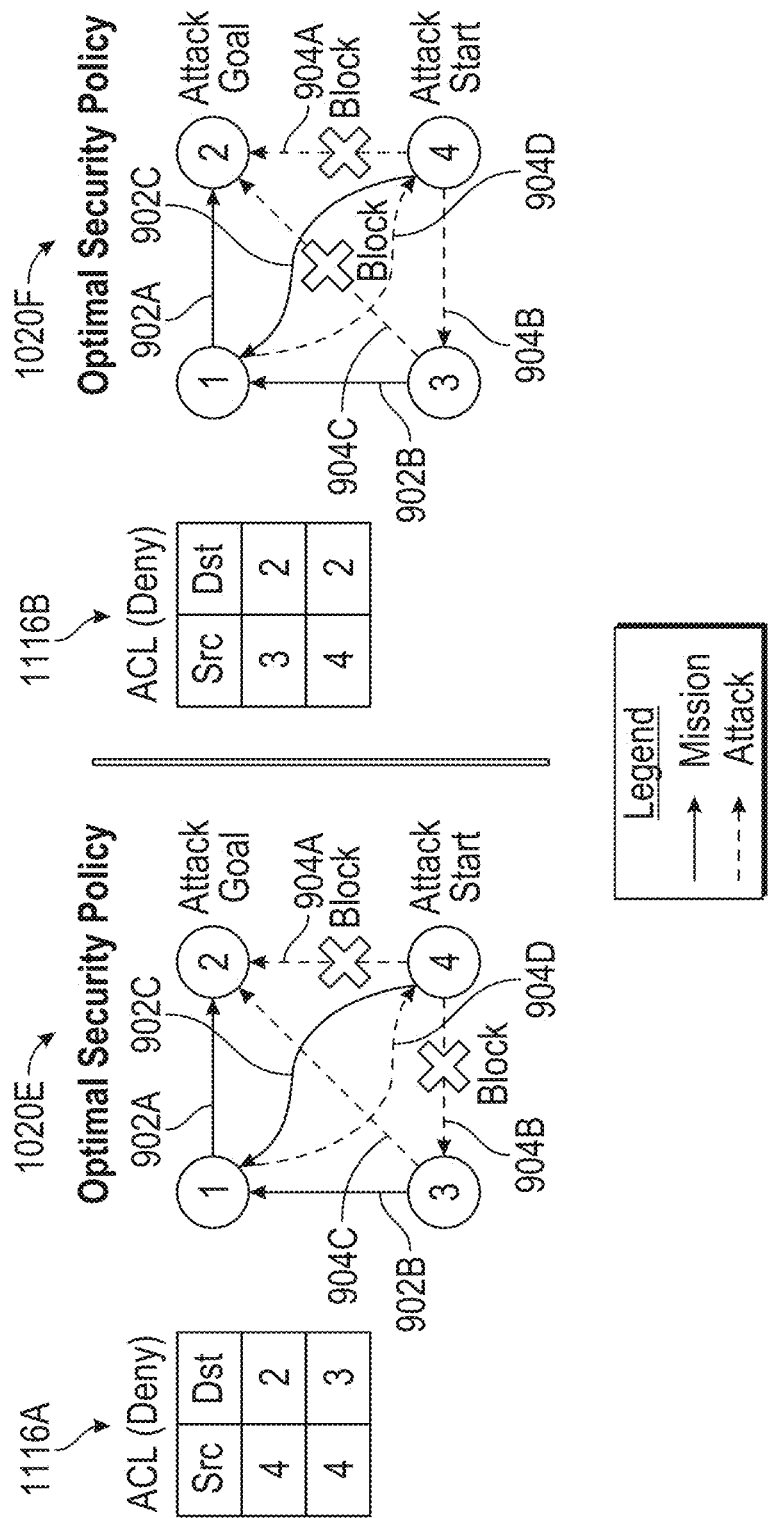
FIG. 11 illustrates exemplary multiple solutions optimal security policies, according to some embodiments of the disclosure.

FIG. 11 illustrates exemplary optimal solutions for the above described example network, according to some embodiments of the disclosure. As shown on the left side of the figure, for the optimal security policy 1020E, the attack edge 904A from host 4 to host 2 and the attack edge 904B from host 4 to host 3 are blocked. These blocked attack edges are listed in the corresponding access control list 1116A.

The optimal security policy 1020F is shown on the right side of the figure. The attack edge 904A from host 4 to host 2 and the attack edge 904C from host 3 to host 2 are blocked. These blocked attack edges are listed in the corresponding access control list 1116B.

As shown in the figure, in some embodiments, there may be a plurality of optimal security policies. The optimal security policies may satisfy both the objective(s) and constraint(s) of the objective function and have the highest scores. Embodiments of the disclosure may include selecting among the optimal security policies by relaxing and repeating the optimization problem. The relaxed optimization problem may use relaxed objectives, relaxed constraints, or both, as discussed below.

Exemplary Relaxed/Second Optimization Process

In some embodiments, in step 206 (of FIG. 2), the system may relax one or more constraints, e.g., when there are multiple optimal security policies. For example, the constraint C1.1 (blocking all attack paths) may be replaced with an objective. An exemplary objective may be to maximize the number of blocked shortest paths. In some embodiments, constraint C1.2 may be relaxed with a budget. For example, instead of ensuring no mission host pair is blocked, there may be a budget for an allowed amount of mission impact. The second optimization problem may be to maximize resilience in terms of blocked attack paths (relaxed constraint C1.1) within a given mission impact budget (relaxed constraint C1.2).

The relaxation may involve forming a relaxed optimization problem. The relaxed/second optimization problem may be formed using one or more relaxed objectives, one or more relaxed constraints, or both. In some embodiments, the optimization problem may have a relaxed objective O2 and a relaxed constraint C2. In some embodiments, the relaxed objective O2 may have a plurality of sub-objectives O2.1, O2.2, and O2.3. In some embodiments, the sub-objectives have may have a priority order. For example, the first sub-objective O2.1 may have a first priority, the second sub-objective O2.2 may have a second priority, and the third sub-objective O2.3 may have a third priority.

More specifically, the relaxed optimization problem may have a relaxed objective of maximizing the blocked shortest attack paths from attack start host to attack goal host (sub-objective O2.1) with minimum impact on the mission (sub-objective O2.2) using the least number of blocked edges (sub-objective O2.3) where the mission impact is within a predetermined budget (relaxed constraint C2). In some embodiments, a sub-objective may be to minimize the total weight of one or more blocked mission edges between host pairs in the mission matrix. In some embodiments, the first priority for the first sub-objective O2.1 may be higher than the second priority (for the second sub-objective O2.2). The second priority be higher than the third priority (for the third sub-objective O2.3).

In some embodiments, graph edges (representing host-to-host connectivity) may be assigned weights. The graph edges may be edges in the attack graph A, mission graph M, or both. For an attack graph A, an edge weight represents the value of the edge in helping to thwart attacks. For example, an attack edge weight may represent the expected time to compromise one host from another. A longer expected time may be represented by a higher attack edge weight. A higher attack edge weight may affect the path length when solving the shortest path problem (discussed below).

For a mission graph M, an edge weight represents the importance of a mission edge to the mission. For example, a mission edge weight may represent the relative volume of traffic between hosts. A mission edge (connection between two hosts) may have a high volume of traffic, and thus be considered important. A higher volume of traffic may be represented by a higher mission edge weight. In some embodiments, a higher mission edge weight may be an indicator of mission need. A higher mission edge weight may affect the path length when solving the shortest path problem (discussed below).

In some embodiments, sub-objective O2.1 may be based on the k-shortest-paths problem. In the k-shortest-paths problem, the system may find the k shortest paths from a start host s to a target host t in a directed weight graph for an arbitrary natural number k. In some embodiments, the k value may not be a predetermined number; the system may determine shortest paths until a predetermined threshold has been reached. For example, the system may determine those k shortest paths until the mission impact is within a given predetermined budget (constraint C2) when the shortest paths are blocked.

To solve the k-shortest-paths problem, the system may determine the path length $l_i$ for a given shortest path i in the attack graph A. The path length $l_i$ may be the sum of edge weights along path i. The system may then rank the shortest paths length in ascending order (most optimal to least optimal). In other words, $l_1 \leq l_2 \leq \ldots \leq l_k$. The shortest attack path i in the attack graph A may be blocked when the path i does not exist in the corresponding hardened attack graph A'. The system determines the blocked shortest attack path $l_i^{blocked}$. A security policy may be considered more optimal if it blocks a dominance-blocked attack path $l_i^{blocked}$. A dominance-blocked attack path is an attack path having a length shorter than the blocked shortest attack path $l_i^{blocked}$.

Sub-objective O2.1 may be to maximize the dominance-blocked attack paths $l_i^{blocked \geq}$.

$$O2.1: \max_P \sum_i l_i^{blocked \geq} \quad (33)$$

In some embodiments, sub-objective O2.2 may minimize the impact on the mission. A hardened mission edge $m'_{ij}$ (in a hardened mission graph M') is impacted by policy P when the policy denies connectivity from host i to host j ($p_{i,j}=0$).

$$O2.2: \min_{M'} \sum_{i,j} m_{i,j}^{impact} \quad (34)$$

where $m_{i,j}^{impact}$ is the impacted mission edge weight.

In some embodiments, sub-objective O2.3 may minimize the number of blocked edges in the policy rules graph P, independent of the attack graph A and mission graph M. Minimizing the number of blocked edges in the policy rules graph P (for which $p_{i,j}=0$) corresponds to maximizing the number of unblocked edges (for which $p_{i,j}=1$).

$$O2.3: \max_P \sum_{i,j} p_{i,j} \quad (35)$$

The overall objective O2 may be stated in terms of priorities (dominance relations) among the sub-objectives O2.1, O2.2, and O2.3:

$$O2:O2.1 > O2.2 > O2.3 \quad (36)$$

In other words, for objective O2, the first sub-objective O2.1 (shortest attack paths blocked) has a higher priority (dominates) the second sub-objective O2.2 and third sub-objective O2.3. The second sub-objective O2.2 (minimize mission impact) dominates the third sub-objective O2.3 (minimum policy edges block.

The optimal security policy may be the security policy that has highest dominance sub-objective among candidate security policies. That is, the optimal security policy has the highest score for the one or more objectives/sub-objectives having the highest priority. For example, a first candidate security policy may be better than a second candidate security policy if the first sub-objective O2.1 of the first candidate security policy is better than the first sub-objective O2.1 of the second candidate security policy. In this instance, the first candidate security policy may determined to be the optimal security policy regardless of the relative second sub-objective O2.2 and the third sub-objective O2.3 of the two candidate security policies.

If the first candidate security policy and the second candidate security policy have the same score for the first sub-objective O2.1, then the optimal security policy may be chosen based on the sub-objective having the next highest priority (e.g., the second sub-objective O2.2). In such an instance, a first candidate security policy may be better than a second candidate security policy if the second sub-objective O2.2 of the first candidate security policy is better than the second sub-objective O2.2 of the second candidate security policy. The score for the first sub-objective O2.1 may be the same for both combinations. The first candidate security policy may be better than the second candidate security policy regardless of the third sub-objective O2.3.

If the first candidate security policy and the second candidate security policy have the same score for the first sub-objective O2.1 and the same score for the second sub-objective O2.2, then the optimal security policy may be determined based on the third sub-objective O2.2. In this instance, the optimal security policy has the highest third sub-objective O2.3.

Figure 12:
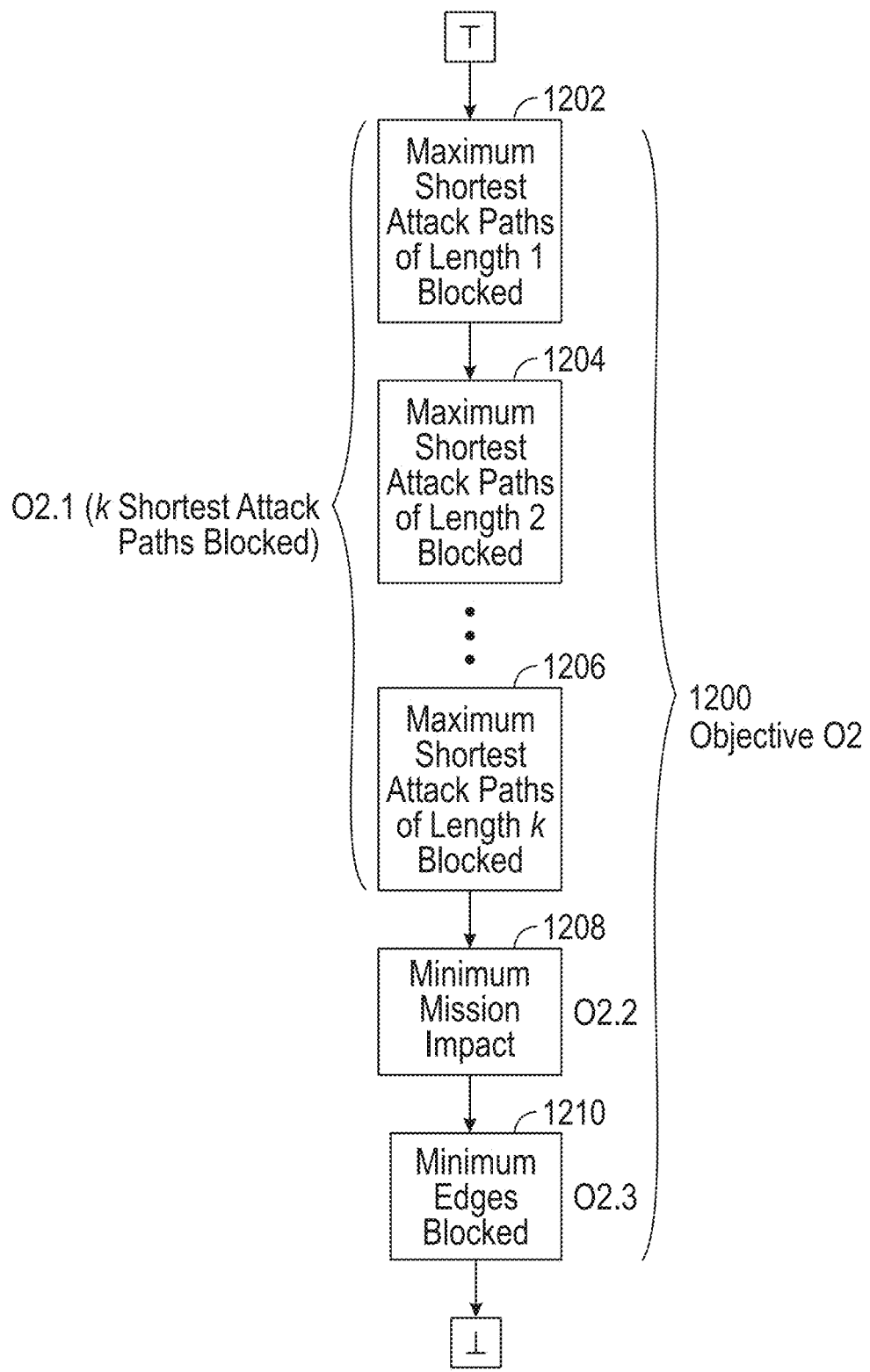
FIG. 12 illustrates exemplary priorities between a plurality of sub-objectives, according to some embodiments of the disclosure.

FIG. 12 illustrates exemplary priorities between a plurality of sub-objectives of an objective, according to some embodiments of the disclosure. In the example shown in the figure, the attack edges have unit weight, so the blocked shortest length-one paths dominate the shortest length-two paths. As shown, the first sub-objective O2.1 1202 has the highest priority. The second sub-objective O2.2 1208 has the next highest priority, and the third sub-objective O2.3 1210 has the lowest priority among the sub-objectives included in objective O2 1200. For the first sub-objective O2.1, maximizing the shortest length-one attack paths being blocked 1202 has a higher priority than maximizing the shortest length-two attack paths being blocked 1204, which has a higher priority than maximizing the shortest length-three attack paths being blocked 1206.

Figure 13:
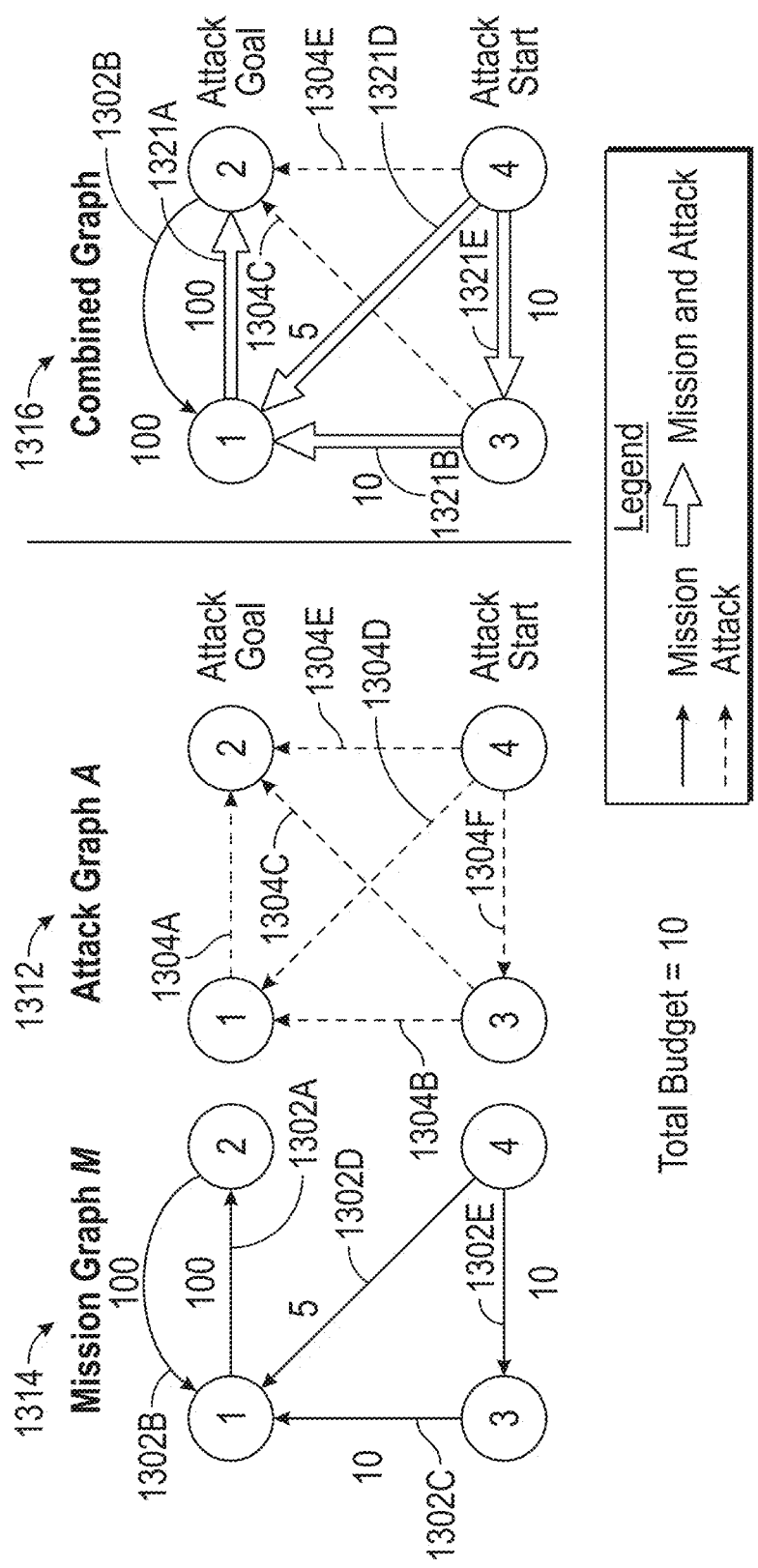
FIG. 13 illustrates exemplary mission graph, attack graph, and combined graph for an optimization problem having a relaxed constraint, according to some embodiments of the disclosure.

FIG. 13 illustrates exemplary mission graph, attack graph, and combined graph for an optimization problem having a relaxed constraint, according to some embodiments of the disclosure. The relaxed constraint C1.2 may be to have a value that is within a budget of 10 units for an allowed mission impact.

The mission graph/matrix and attack graph/matrix may reflect the weights assigned to edges. The weighted mission graph M 1314 and attack graph A 1312 may have the following corresponding mission matrix M and attack matrix A:

$$M = \begin{bmatrix} 0 & 100 & 0 & 0 \\ 100 & 0 & 0 & 0 \\ 10 & 0 & 0 & 0 \\ 5 & 0 & 10 & 0 \end{bmatrix} \quad (37)$$

$$A = \begin{bmatrix} 0 & 1 & 0 & 0 \\ 0 & 0 & 0 & 0 \\ 1 & 1 & 0 & 0 \\ 1 & 1 & 1 & 0 \end{bmatrix} \quad (38)$$

The mission edge 1302A ($m_{1,2}$ from host 1 to host 2) and the mission edge 1302B ($m_{2,1}$ from host 2 to host 1) may be assigned weights of 100. The mission edge 1302C ($m_{3,1}$ from host 3 to host 1) may be assigned a weight of 10, the mission edge 1302D ($m_{4,1}$ from host 4 to host 1) may have a weight of 10, and the mission edge 1302E ($m_{4,1}$ from host 4 to host 3) may have a weight of 5.

The attack graph A 1312 has attack edges 1304A (from host 1 to host 2), 1304B (from host 3 to host 1), 1304C (from host 3 to host 2), 1304D (from host 4 to host 1), 1304E (from host 4 to host 2), and 1304F (from host 4 to host 3). In some embodiments, the weights for all attack edges may be 1.

As shown in the figure, the mission edges 1302A ($m_{1,2}$) and 1302B ($m_{2,1}$) have values that exceed the budget of 10, so they remain unblocked in the policy rules graph ($p_{1,2}=1$, $p_{2,1}=1$). The policy rules graph P (blocked edges) considered are the edges in the attack graph A. The policy rules matrix P may be:

$$P = \begin{bmatrix} 0 & 1 & 1 & 1 \\ 1 & 0 & 1 & 1 \\ p_{3,1} & p_{3,2} & 0 & 1 \\ p_{4,1} & p_{4,2} & p_{4,3} & 0 \end{bmatrix} \quad (39)$$

The combined graph 1316 shows the combined edges 1321, attack edges 1304C and 1304E, and mission edge 1302B. The combined edges 1321A, 1321B, 1321D, and 1321E indicate the presence of both corresponding attack and mission edges between given hosts.

FIG. 14 illustrates exemplary candidate security policies for an objective with a plurality of sub-objectives, according to some embodiments of the disclosure. The system may analyze $2^5=32$ potential security policies. The mission impact values that exceed a predetermined budget (e.g., 10 units) are shaded in the total mission impact column and are marked infeasible. The row for the optimal security policy is shaded in the figure.

Figure 15:
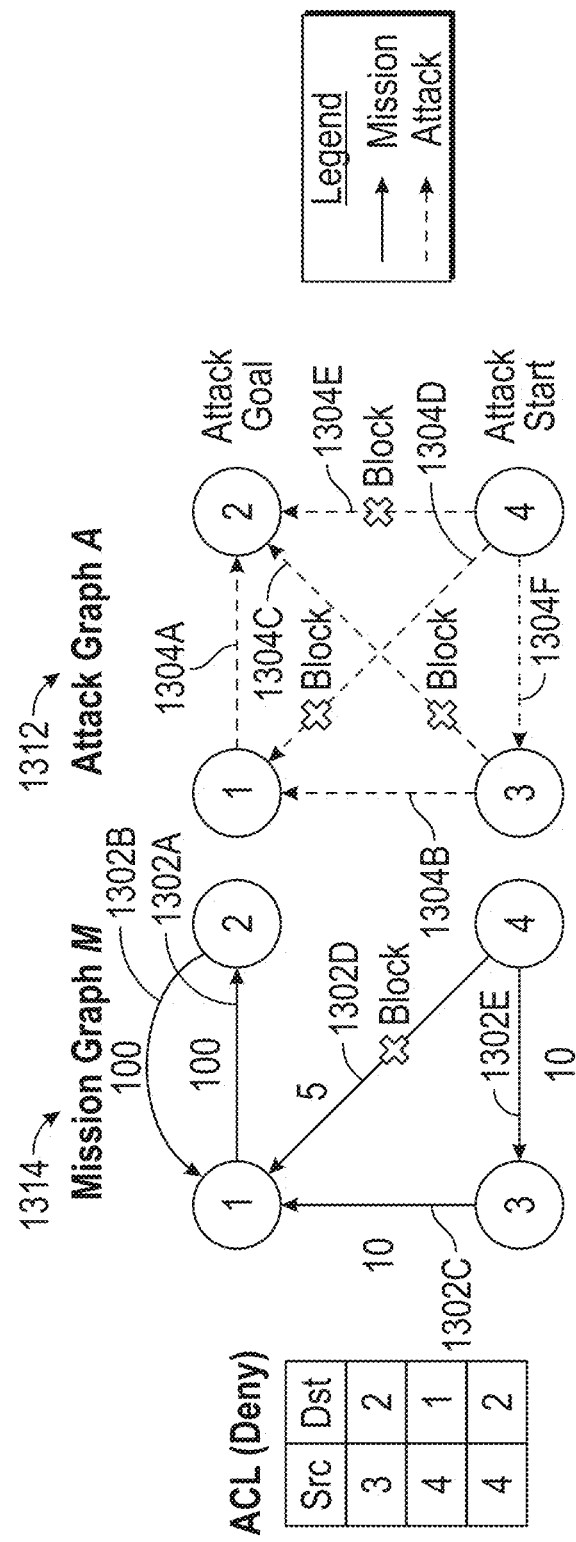
FIG. 15 illustrates an exemplary optimal security policy, according to some embodiments of the disclosure.

FIG. 15 illustrates the exemplary optimal security policy comprising $\{p_{3,1}=1, p_{3,2}=0, p_{4,1}=0, p_{4,2}=0, p_{4,3}=1\}$. For length-one paths, the attack edge 1304E (from host 4 to host 2) may be blocked. For length-two paths, the paths from host 4 to host 2 may be blocked. The first path may comprise attack edge 1304D (and mission edge 1302D) and attack edge 1304A (and mission edge 1302A). The second path may comprise attack edge 1304F (and mission edge 1302E) and attack edge 1304C. For length-three paths, the path from host 4 to host 2 may be blocked; this path may comprise attack edge 1304F (and mission edge 1302E), attack edge 1304B (and mission edge 1302C), and attack edge 1304A (and mission edge 1302A).

Exemplary Further Relaxed/Third Optimization Problem

In some embodiments, in step 208 (of FIG. 2), the system may further relax one or more constraints placed on the third optimization problem. In some embodiments, step 208 may involve a relaxed optimization problem having no constraints. For example, the constraint C1.2 may be further relaxed and replaced with an objective. The objective O3 may comprise a plurality of sub-objectives O3.1, O3.2, and O3.3.

The objective may allow a Pareto-optimal tradeoff between security (attack resilience) and mission needs (impact from blocked hosts). A solution is Pareto-optimal if in a multi-objective optimization, none of its objectives can be improved without worsening some of its other objectives. A set of solutions that are Pareto-optimal may be referred to as Pareto front. A Pareto front may be a set of non-dominated solutions, where no objective can be improved without sacrificing at least one other objective. In determining the Pareto front solutions, the system may identify a set of candidate solutions for analyzing tradeoffs among conflicting objectives.

More specifically, the optimization problem may have an objective of maximizing the blocked shortest attack paths from attack start host to attack goal host (sub-objective O3.1) using the least number of blocked policy edges (sub-objective O3.2) while minimizing the impact on the mission (sub-objective O3.3).

In some embodiments, graph edges may be assigned weights. The graph edges may be edges in the attack graph A, mission graph M, or both. For an attack graph A, an edge weight represents the value of the edge in helping to thwart attacks. For example, an attack edge weight may represent the expected time to compromise one host from another. For a mission graph M, an edge weight represents the value of the edge to the organizational mission. For example, a mission edge weight may represent the relative volume of traffic between hosts for an organization that values high traffic volume as an indicator of mission need.

In some embodiments, a sub-objective may comprise multiple sub-objectives. Sub-objective O3.1 may comprise multiple sub-objectives O3.1.1 and O3.1.2. Sub-objective O3.1 may be similar to sub-objective O2.1 (discussed above), maximizing the dominance-blocked attack paths $l_i^{blocked \geq}$.

$$O3.1.1: \max_P \sum_i l_i^{blocked \geq} \qquad (40)$$

Sub-objective O3.1.2 may be similar to sub-objective O2.3 (discussed above), minimizing the number of blocked edges in the policy rules graph P, independent of the attack graph A and mission graph M.

$$O3.1.2: \max_P \sum_{i,j} p_{i,j} \qquad (41)$$

The overall sub-objective O3.1 may be stated in terms of priorities among the sub-objectives O3.1.1 and O3.1.2:

$$O3.1:O3.1.1 > O3.1.2 \qquad (42)$$

For sub-objective O3.1, the sub-objective O3.1.1 (shortest attack paths blocked) dominates the sub-objective O3.1.2 (minimum policy edges blocked).

The optimal solution is based on the highest dominance sub-objective that is not equal among a plurality of solutions. For example, a first solution (solution A) may be better than a second solution (solution B) if the first sub-objective O3.1.1 of the first solution A is better than the first sub-objective O3.1.1 of the second solution B. In this instance, the first solution A may be better than the second solution regardless of the second sub-objective O3.1.2.

If the first solution A and the second solution B have the same optimality of the first sub-objective O3.1.1, then the optimality is based on the second sub-objective O3.1.2. A first solution (solution A) may be better than a second solution (solution B) if the second sub-objective O3.1.2 of the first solution A is better than the second sub-objective O3.1.2 of the second solution B.

Objective O3.2 may be similar to sub-objective O2.2 (discussed above), minimizing the impact on the mission.

$$O3.2: \min_{M'} \sum_{i,j} m_{i,j}^{impact} \qquad (43)$$

Figure 16:
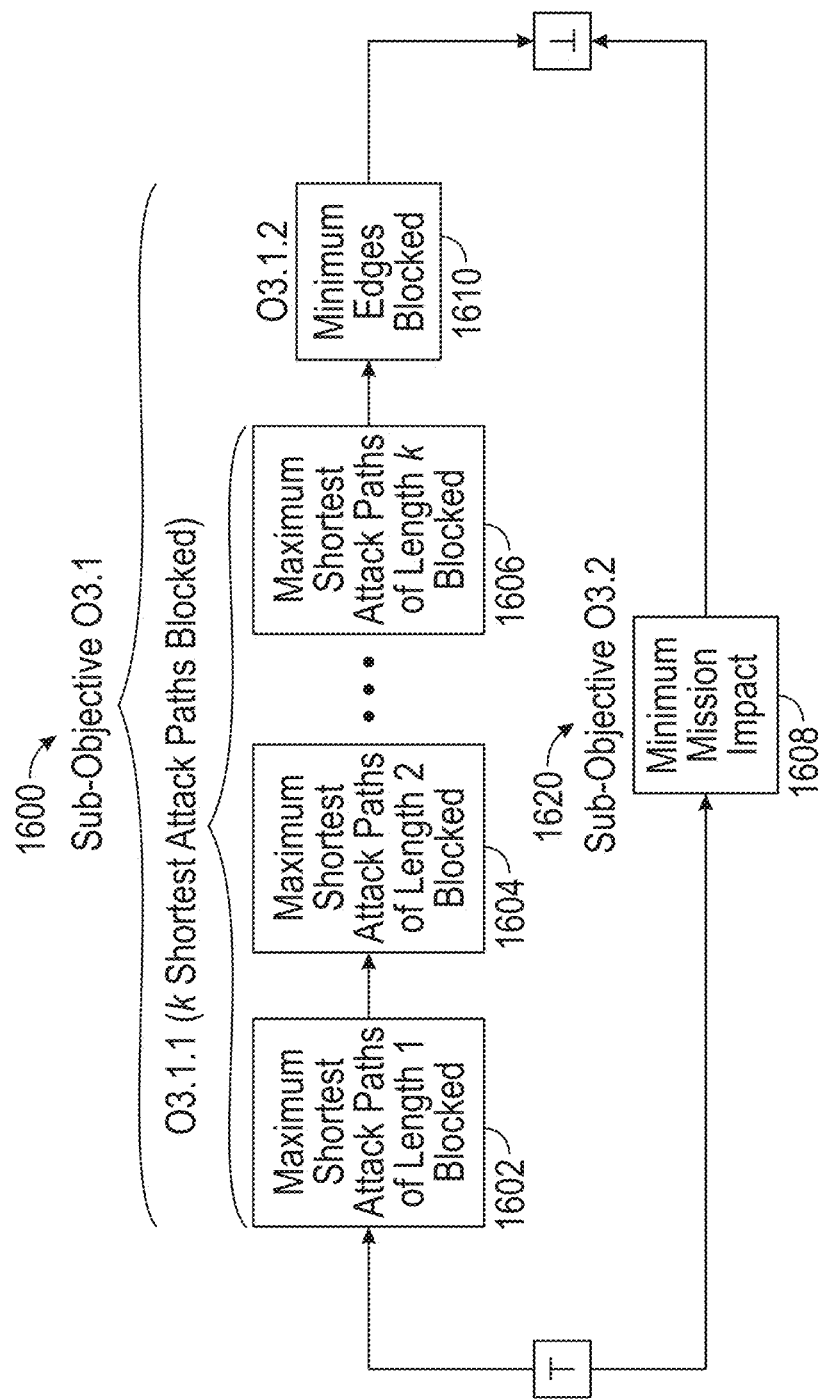
FIG. 16 illustrates exemplary priorities between a plurality of sub-objectives, at least one sub-objective comprising a plurality of sub-objectives, according to some embodiments of the disclosure.

FIG. 16 illustrates an exemplary priorities between two sub-objectives, one having a plurality of sub-objectives, according to some embodiments of the disclosure. In the example shown in the figure, the attack edges have unit weight, so the blocked shortest length-one paths dominate the shortest length-two paths. As shown in the figure, the first sub-objective O3.1 1600 is analyzed separately from second sub-objective O3.2 1620. In some embodiments, the first sub-objective O3.1 may comprise multiple sub-objectives O3.1.1 and O3.1.2. The first sub-objective O3.1 1600 may have the same priority as the second sub-objective O3.2 1620. The sub-objectives O3.1.1 and O3.1.2 may have different priorities, such as each sub-objective 1602, 1604, and 1606 of the first sub-objective O3.1.1 (k shortest attack paths blocked) may have a higher priority than the sub-objective O3.1.2 (minimum number of mission edges blocked).

Figure 17:
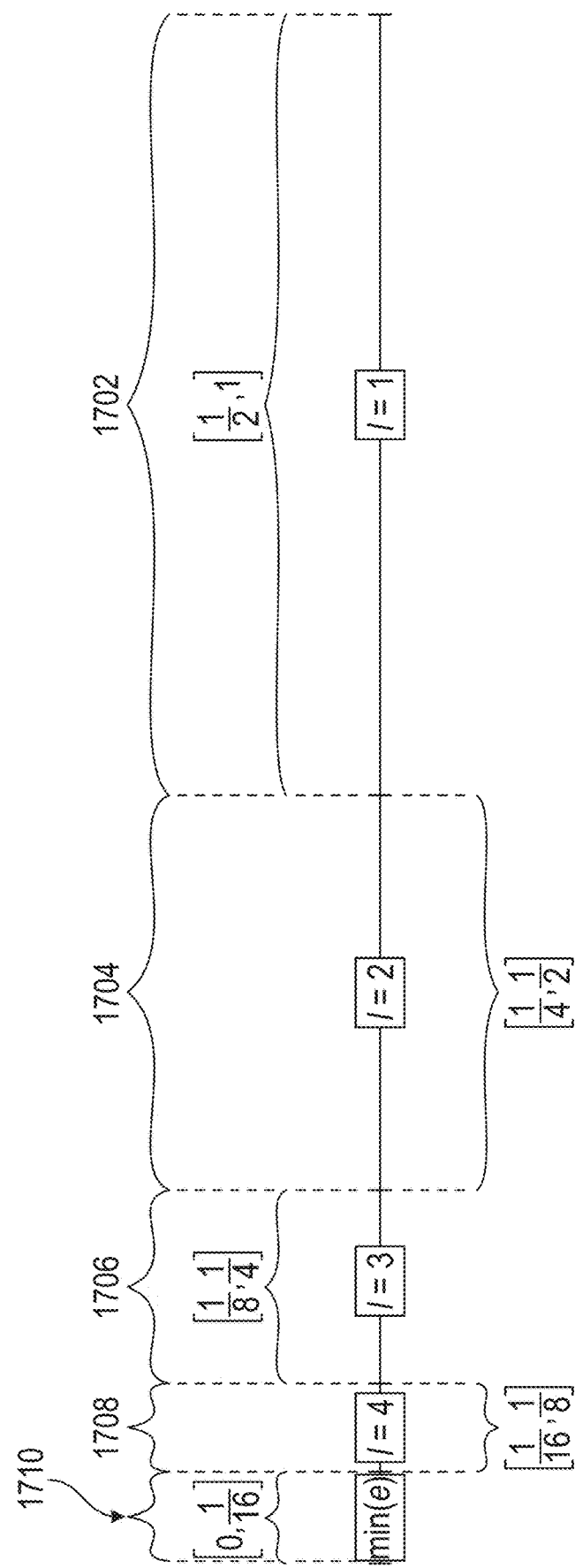
FIG. 17 illustrates exemplary numerical ranges for implementing priorities among sub-objectives, according to some embodiments of the disclosure.

In some embodiments, the priorities among sub-objectives may be implemented as numerical ranges, as exemplified in FIG. 17. The numbers of allowed shortest paths from attack start hosts to attack goal hosts may be assigned to the numerical range for a given path length. For example, as shown in the figure, a given candidate security policy having a number of blocked length-one paths may be mapped to the range 1702 of ½ (no length-one paths blocked) to 1 (all possible length-one paths blocked). A given candidate security policy having a number of blocked length-two paths may be mapped to the range 1704 of ¼ (no length-two paths blocked) to ½ (all possible length-two paths blocked). A given candidate security policy having a number of blocked length-three paths may be mapped to the range 1706 of ⅛ (no length-three paths blocked) to ¼ (all possible length-three paths blocked). A given candidate security policy having a number of blocked length-four paths may be mapped to the range 1708 of ¹⁄₁₆ (no length-four paths blocked) to ⅛ (all possible length-four paths blocked). In this manner, the pattern of mapping numbers of progressively longer path lengths to progressively smaller path lengths according to numerical ranges may result in ranking candidate security policies according to priority, as defined in the objective (e.g., sub-objective O3.1.1).

The remaining candidate security policies (if any) (e.g., total number of unblocked edges, sub-objective O3.1.2) may be mapped to the range 1710. Range 1710 may yield candidate security policies that have fewer overall blocked edges for a given number of blocked adversarial paths from attack start hosts to attack goal hosts.

FIG. 18 illustrates exemplary candidate security policies for an objective problem with no mission-impact budget constraint. The system may analyze $2^6=64$ candidate security policies, which takes into account all six attack edges. The six attack edges may be represented in the policy rules graph P is:

$$P = \begin{bmatrix} 0 & p_{1,2} & 1 & 1 \\ 1 & 0 & 1 & 1 \\ p_{3,1} & p_{3,2} & 0 & 1 \\ p_{4,1} & p_{4,2} & p_{4,3} & 0 \end{bmatrix} \qquad (44)$$

A path from host 1 to host 2 has a mission impact of 100 units. This path may not block any attack paths already blocked by other solutions with lower mission impact, but other solutions may have a higher priority than ones in which $p_{1,2}=0$ (blocked). Although the system evaluates 64 candidate security policies, the figure illustrates candidate security policies for five of the six edges ($p_{3,1}$, $p_{3,2}$, $p_{4,1}$, $p_{4,2}$, and $p_{4,3}$) for optimality, where the security policies have $p_{1,2}=1$ (unblocked).

Figure 19:
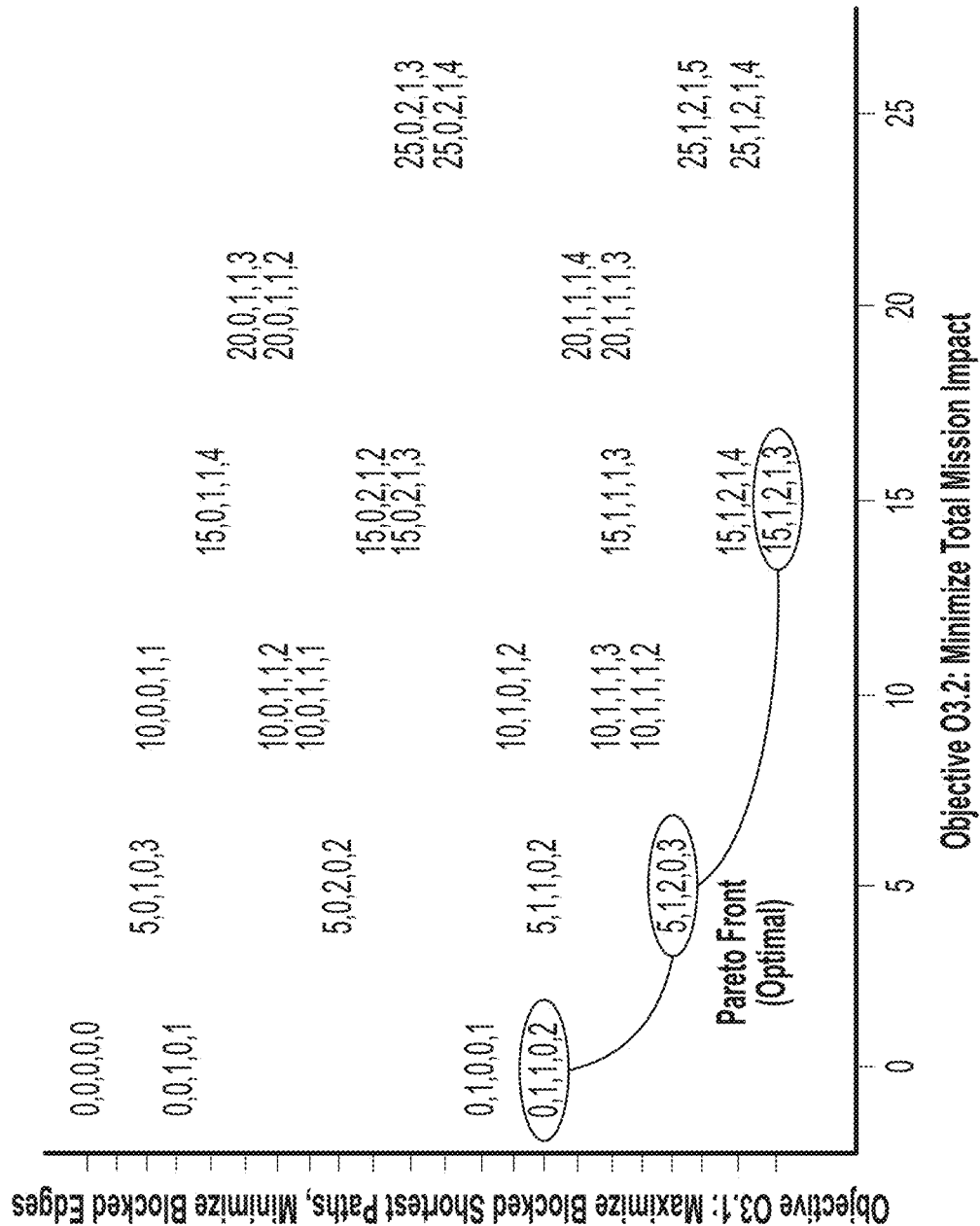
FIG. 19 illustrates a plot of exemplary candidate security policies, according to some embodiments of the disclosure.

The Pareto front solutions of the example are also shown in FIG. 19, which plots exemplary candidate security policies in two dimensions, with sub-objective O3.1 (maximize blocked shortest paths/minimize blocked edges) along one axis and sub-objective O3.2 (minimize total mission impact) along another axis. The values shown in the figure correspond to mission impact, blocked shortest paths for each path length, and blocked edges.

Figure 20:
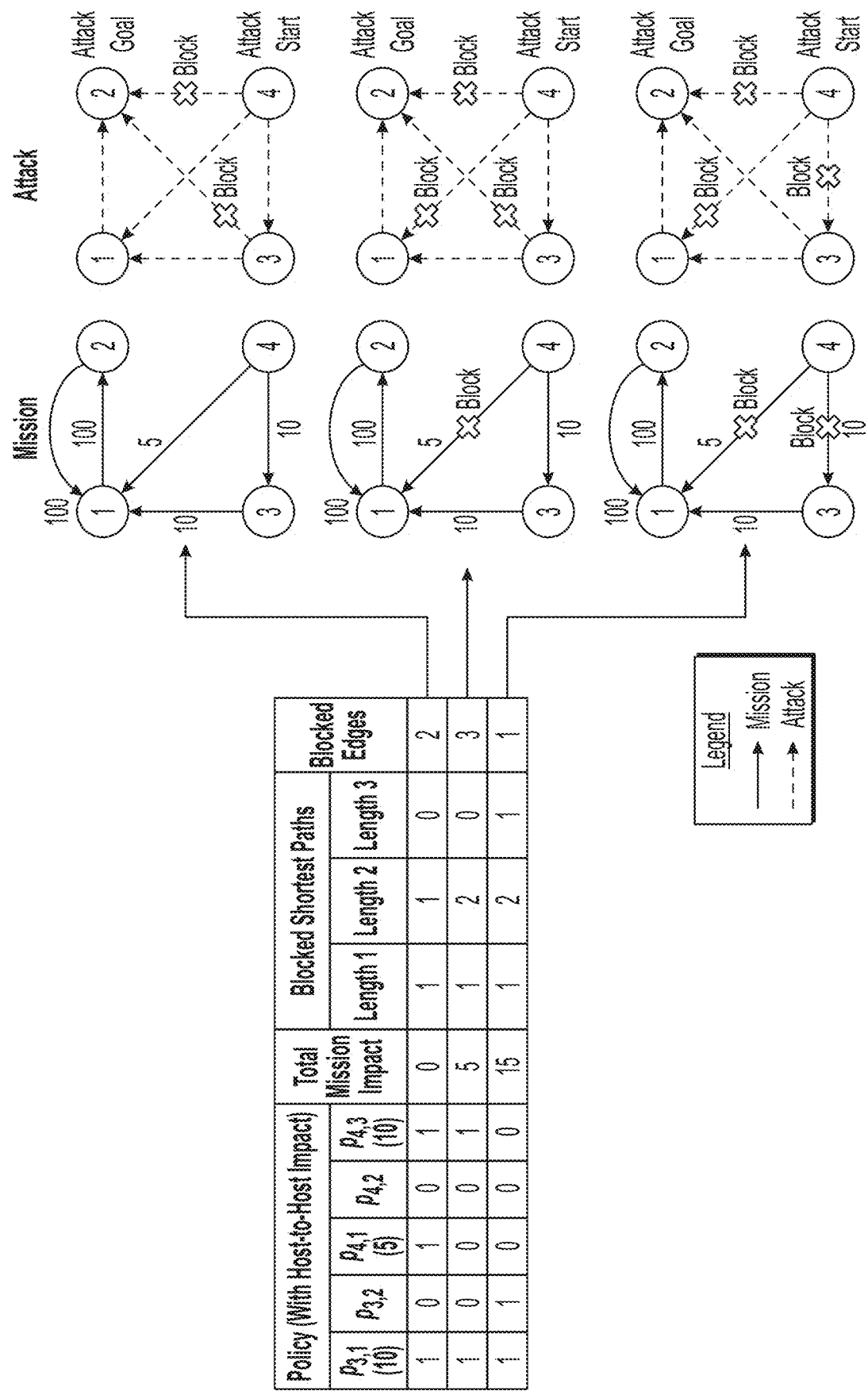
FIG. 20 illustrates exemplary Pareto-optimal solutions, according to some embodiments of the disclosure.

FIG. 20 illustrates a plurality of Pareto-optimal solutions of FIG. 19 to the mission graph M and attack graph A.

Figure 21A:
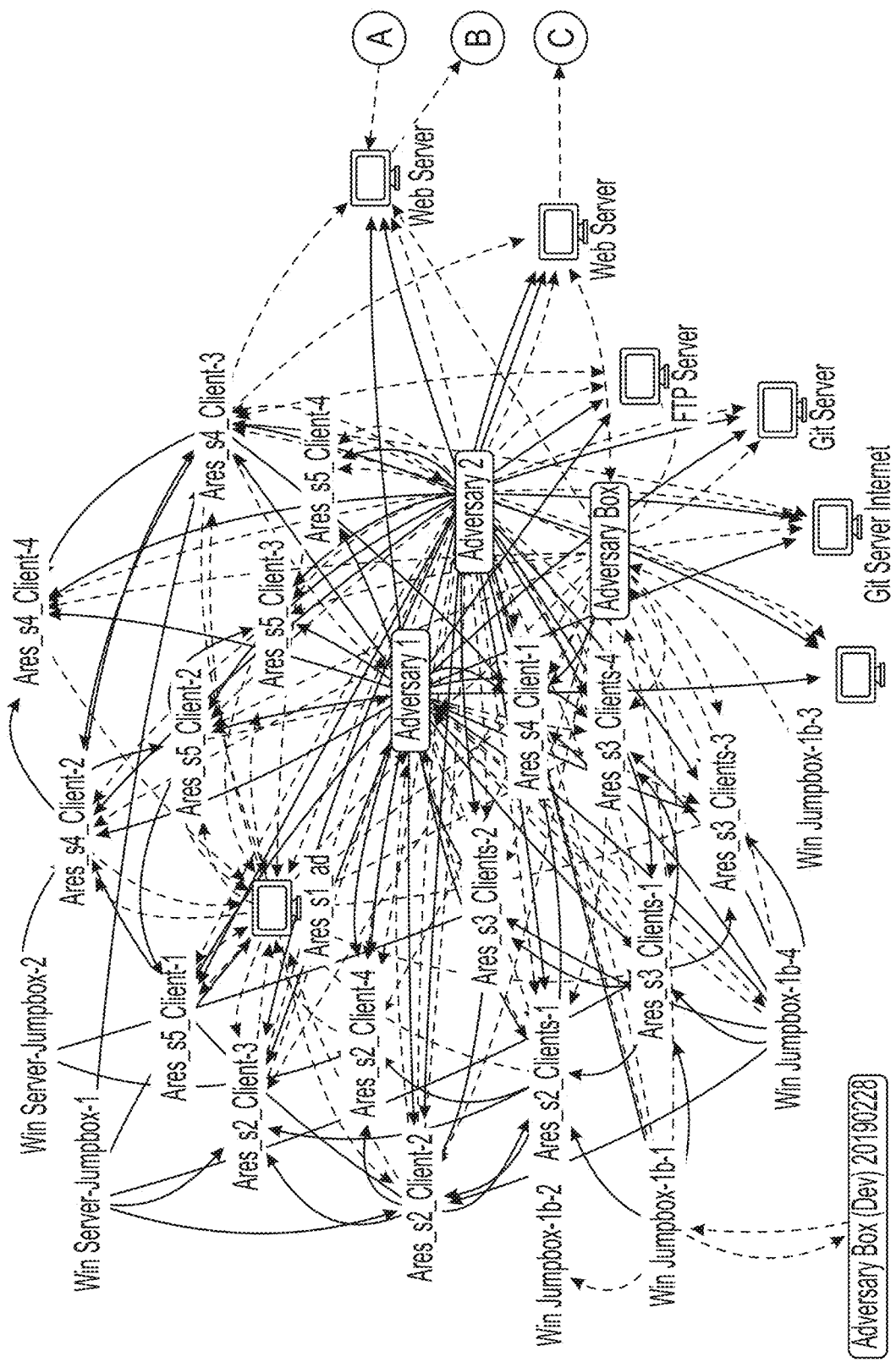
FIG. 21A illustrates an exemplary graph-based model, according to some embodiments of the disclosure.
Figure 21A:
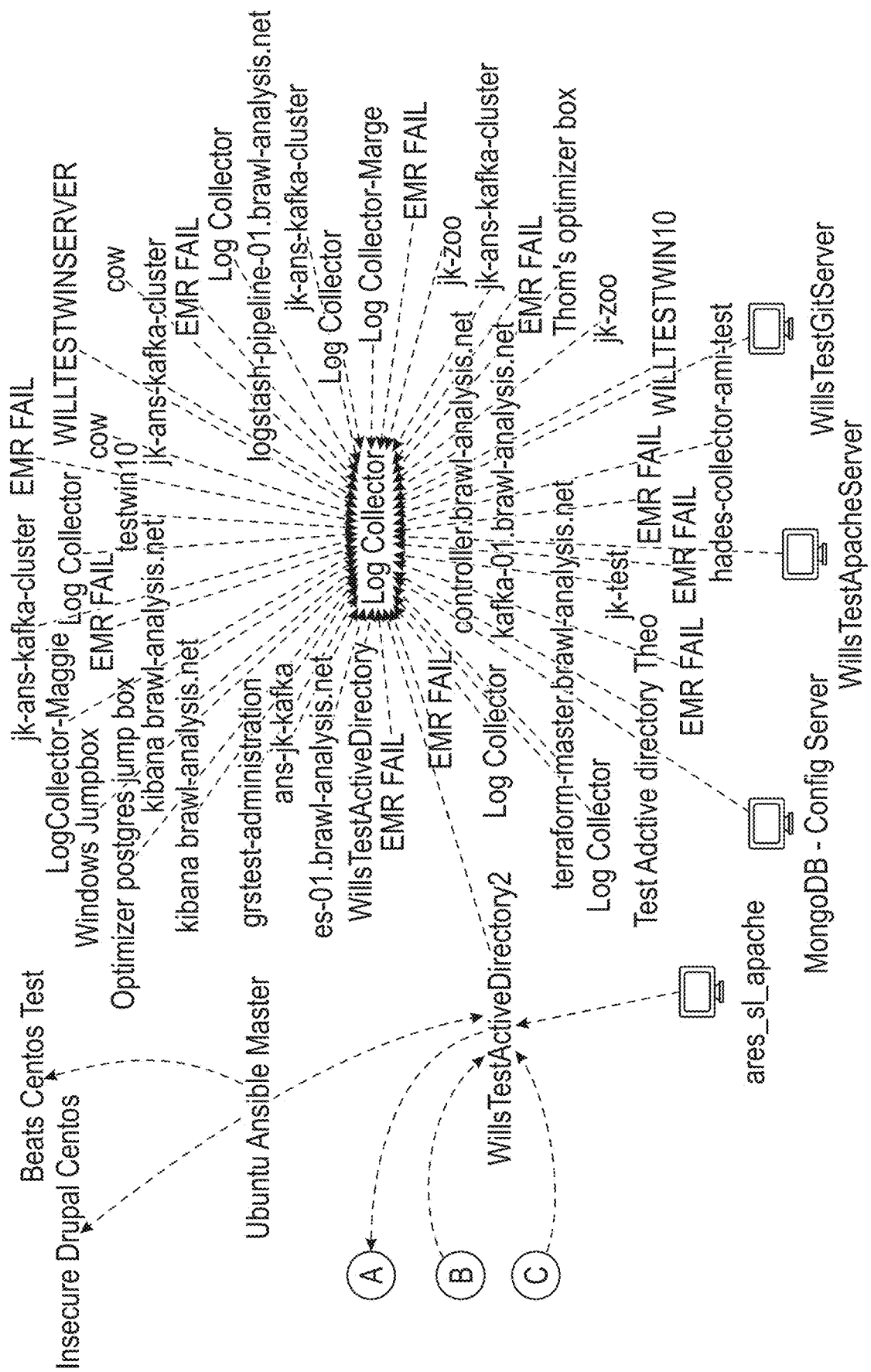

The system may collect, correlate, and use data from a network to be defended. The system may develop a graph-based model for potential multi-step lateral movement through the network. FIG. 21A illustrates an exemplary graph-based model, according to some embodiments of the disclosure. The graph-based model was built from observed network traffic for a baseline (non-optimized) representative enterprise network within a testbed. The graph nodes may represent network hosts, and the graph edges represent the set of network flows from a given source host to a given destination host. The graph-based model may have edges that represent vulnerable services on destination hosts.

Figure 21B:
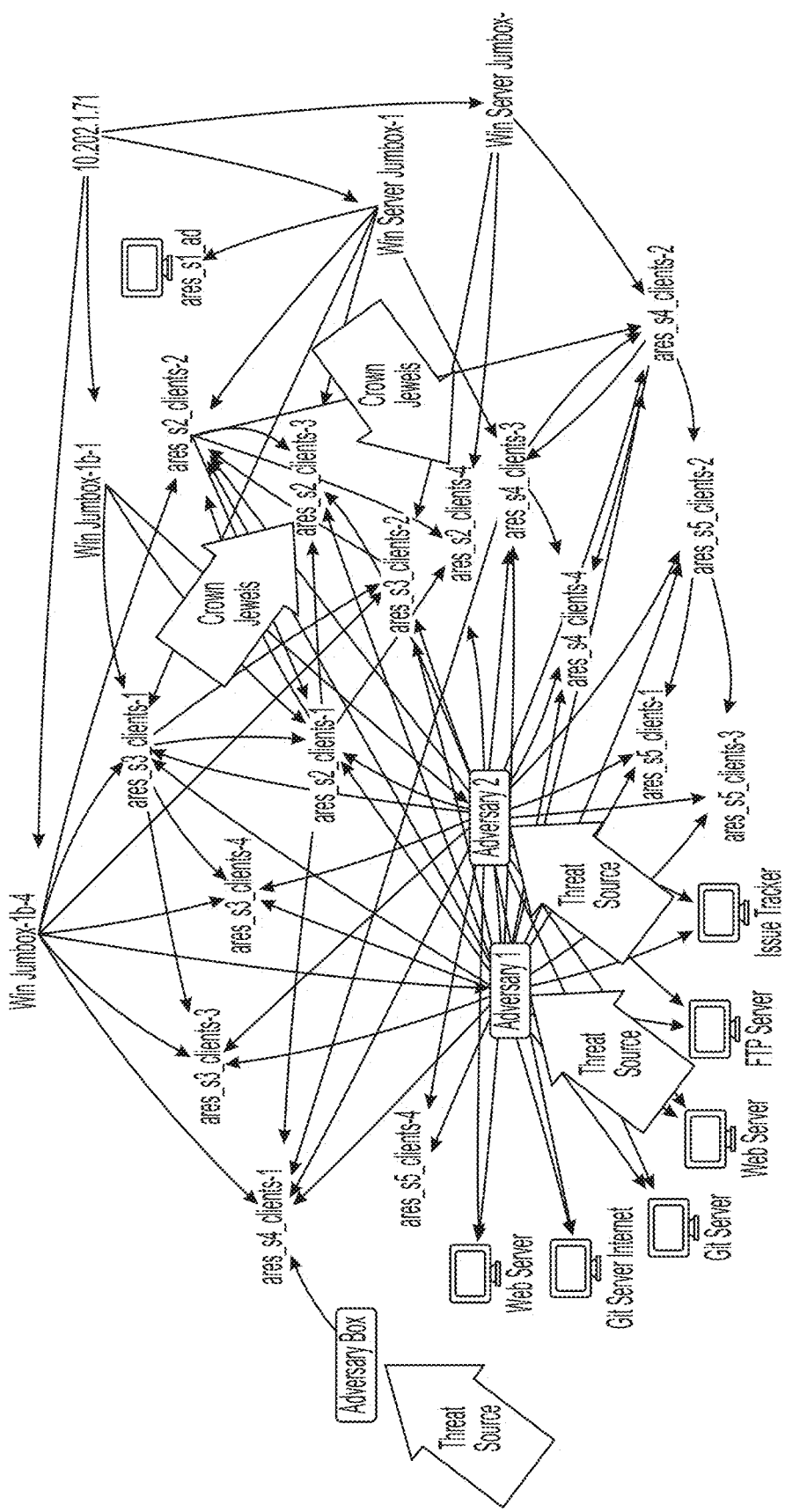
FIG. 21B illustrates an exemplary vulnerable subgraph for a network, according to some embodiments of the disclosure.

FIG. 21B illustrates an exemplary vulnerable subgraph for the network. In some embodiments, a vulnerable subgraph may include only those hosts and edges with at least one vulnerable service reachable from the source host to the destination host. The adversary group may have an initial presence on three hosts, as identified as "threat source" in the figure. The red team may start from the three hosts and move laterally through the network until reaching the two hosts marked "crown jewels."

Figure 22A:
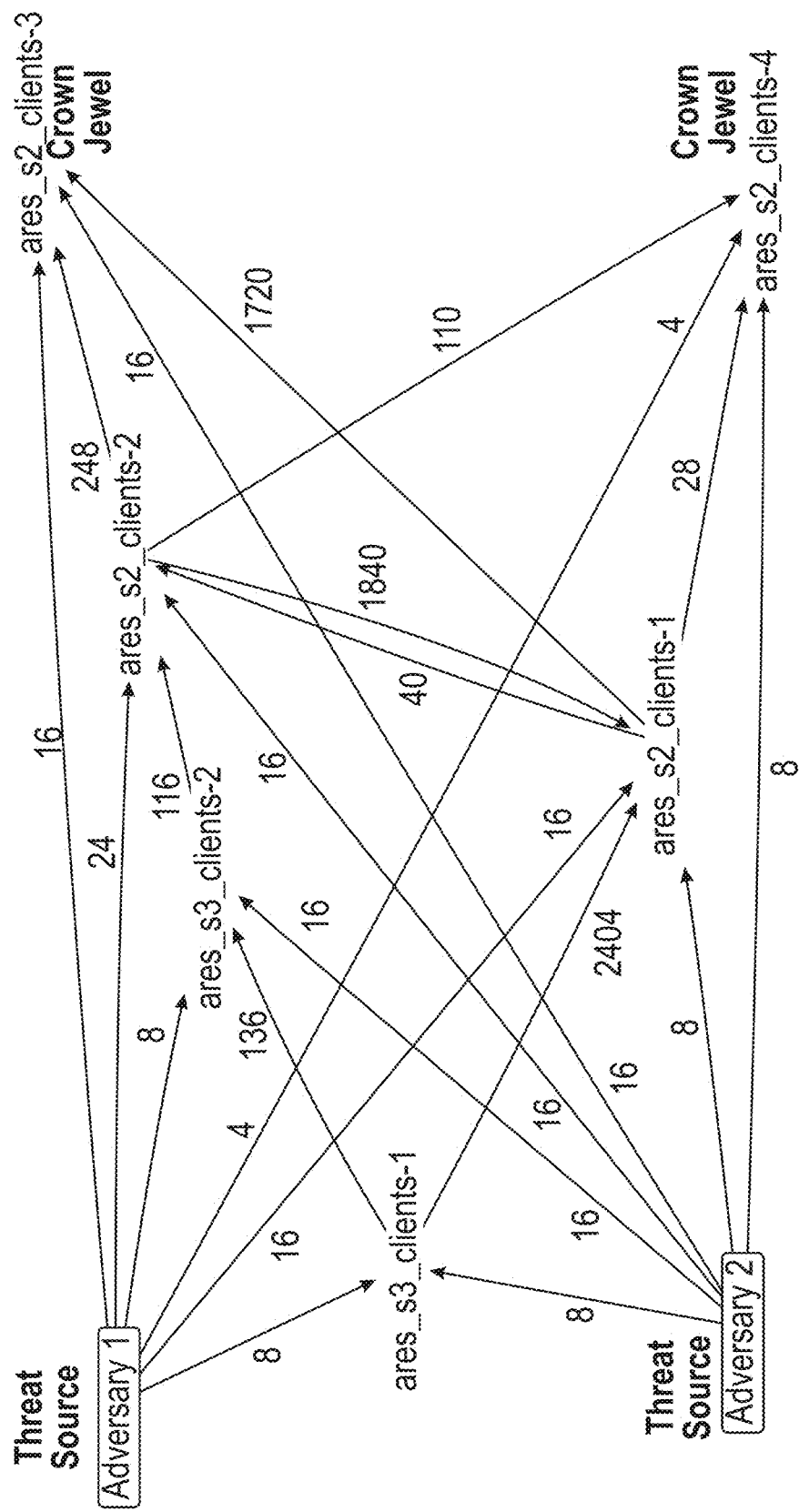
FIG. 22A illustrates a graph of an exemplary optimized microsegmentation policy over a threat/mission situation, according to some embodiments of the disclosure.

FIG. 22A illustrates a graph showing the optimized microsegmentation policy over a threat/mission situation, according to some embodiments of the disclosure. The graph may be constrained to including those vulnerable edges that lie between the threat sources (attack start hosts) and the crown jewels (attack start goals). The paths shown in the graph may show potential adversary lateral movements (attack paths) for the given threat situation. The figure shows the graph edges with numbers indicative of the mission edge weights, representing criticality.

The system may use the network model and threat situation as input to the optimization of the microsegmentation policy. The optimization may include applying evolutionary programming, e.g., in the form of a genetic algorithm to learn the optimal security policy.

In a genetic algorithm, each individual in a population represents a candidate security policy. Each candidate security policy has a particular combination of allowed or denied edges in the network model. At each step of the simulated evolution, the genetic algorithm selects individuals for reproduction based on how well they meet the objective function. For example, the objective function may involve maximizing a given level of tradeoff between adversary effort and access to mission resources for the given threat/mission situation (as discussed above).

Figure 22B:
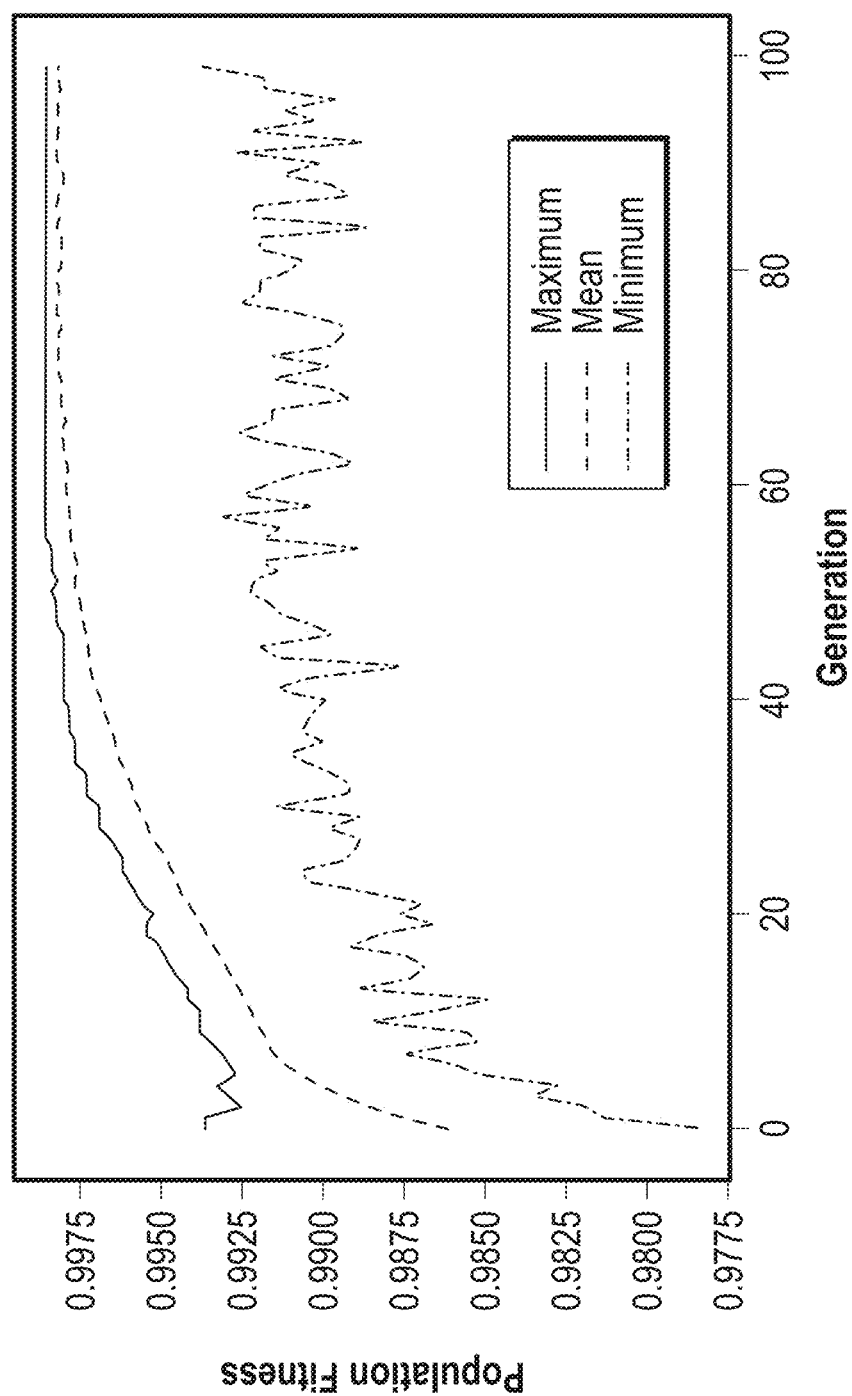
FIG. 22B illustrates a graph of an exemplary fitness value converging to an optimal security policy over time, according to some embodiments of the disclosure.

As shown in FIG. 22B, the fitness value (score from one or more optimization problems) may converge to an optimal security policy over time as the genetic algorithm population evolves. In the example shown in the figure, there are 88 vulnerable edges (exploitable from attack start hosts to attack goal hosts) in the attack graph A. The overall search space of allowed/denied edges may be $10^{26}$. The genetic algorithm execution time may be 14 seconds, for evolution over 100 generations, with a population size of 400.

In some embodiments, one or more objectives may be weighted. For example, sub-objective O3.1 (maximizing adversary effort) may be assigned a first weight, and sub-objective O3.2 (maximizing mission accessibility) may be assigned a second weight. The weights may affect the fitness function and resulting optimal security policy as determined by the genetic algorithm. Lines having a greater thickness may indicate vulnerable connections from source host to destination host that may be blocked in the policy rules matrix P, while other lines indicate allowed connections.

Figure 23A:
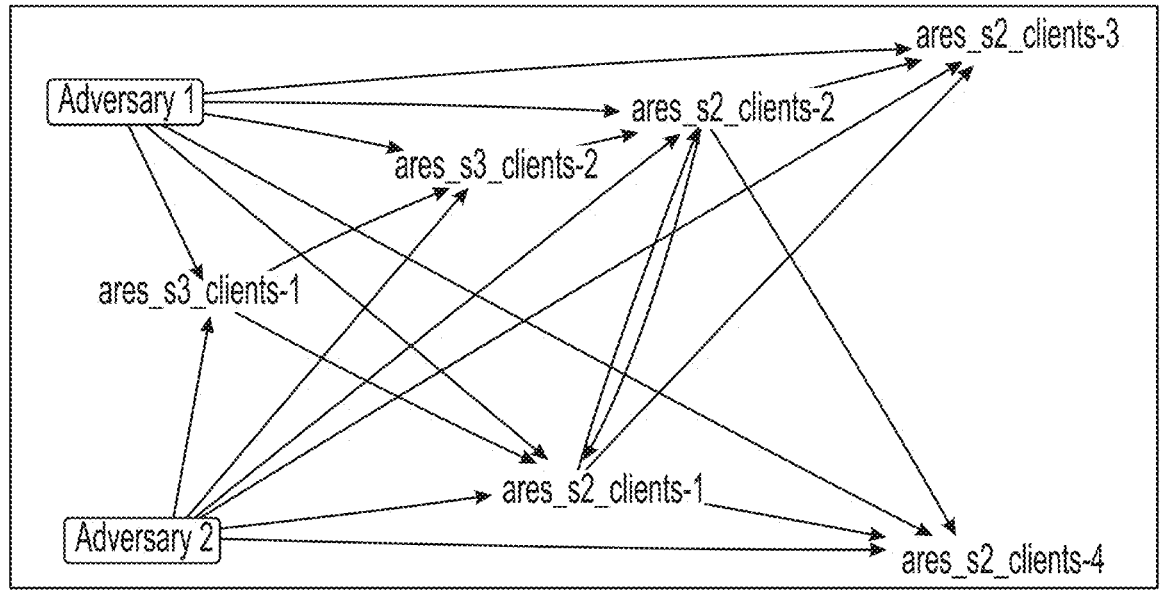
FIGS. 23A-23F illustrate different exemplary optimal security policies based on different weights assigned to objectives or sub-objectives, according to some embodiments of the disclosure.
Figure 23B:
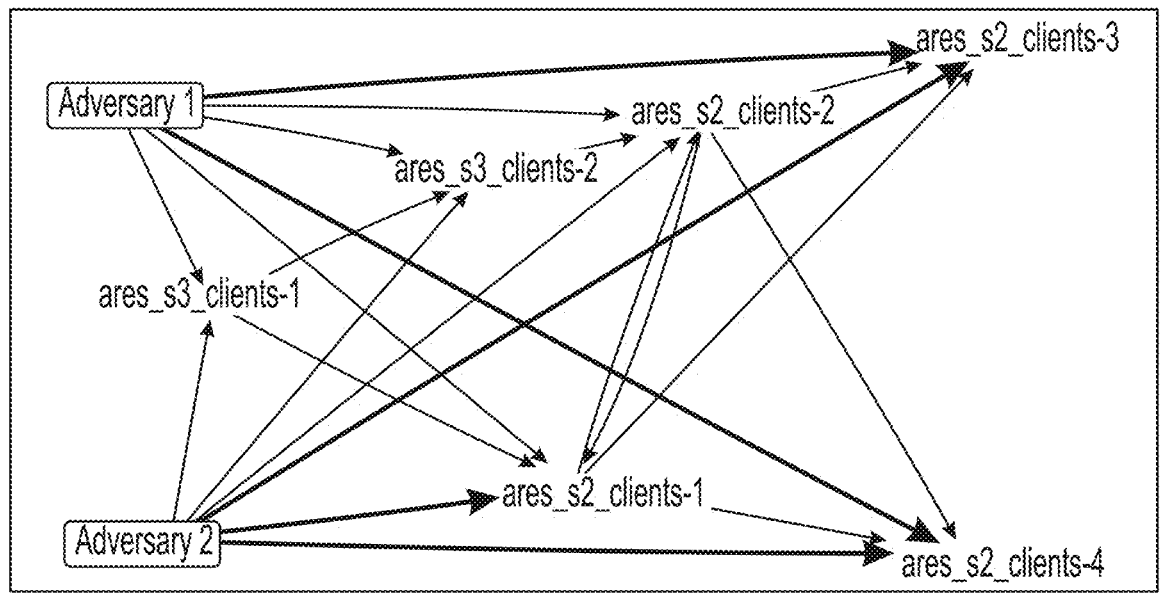
Figure 23C:
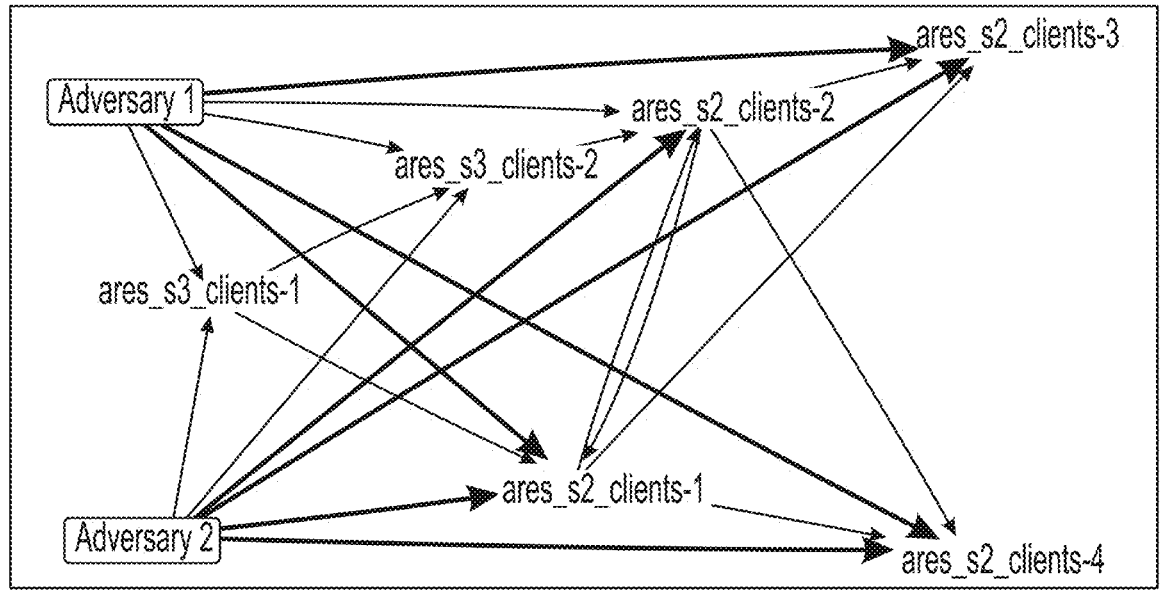
Figure 23D:
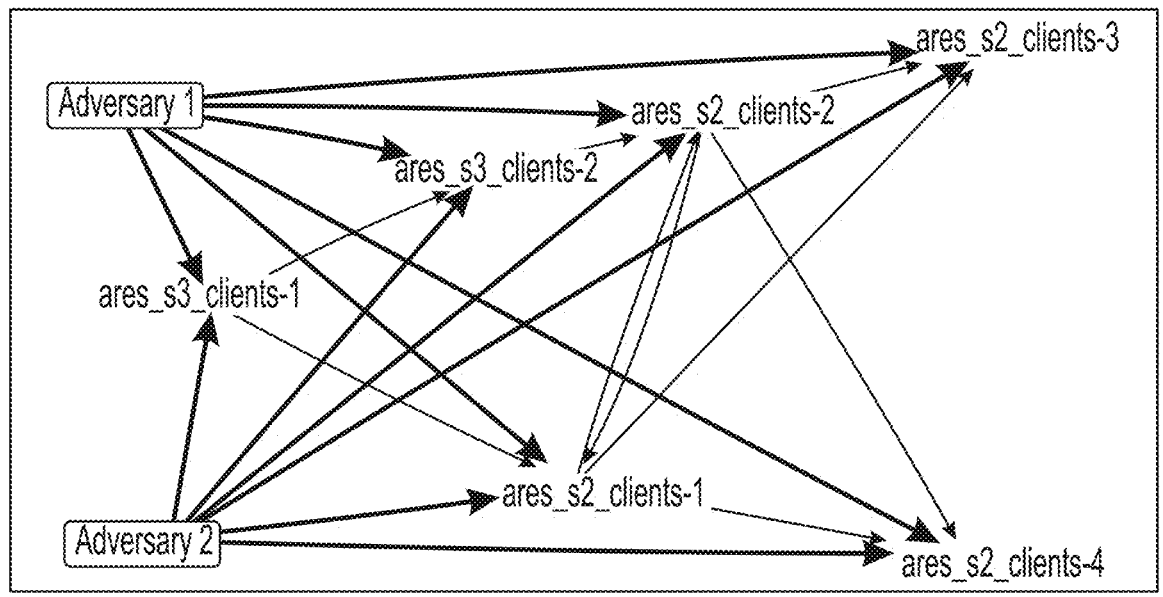
Figure 23E:
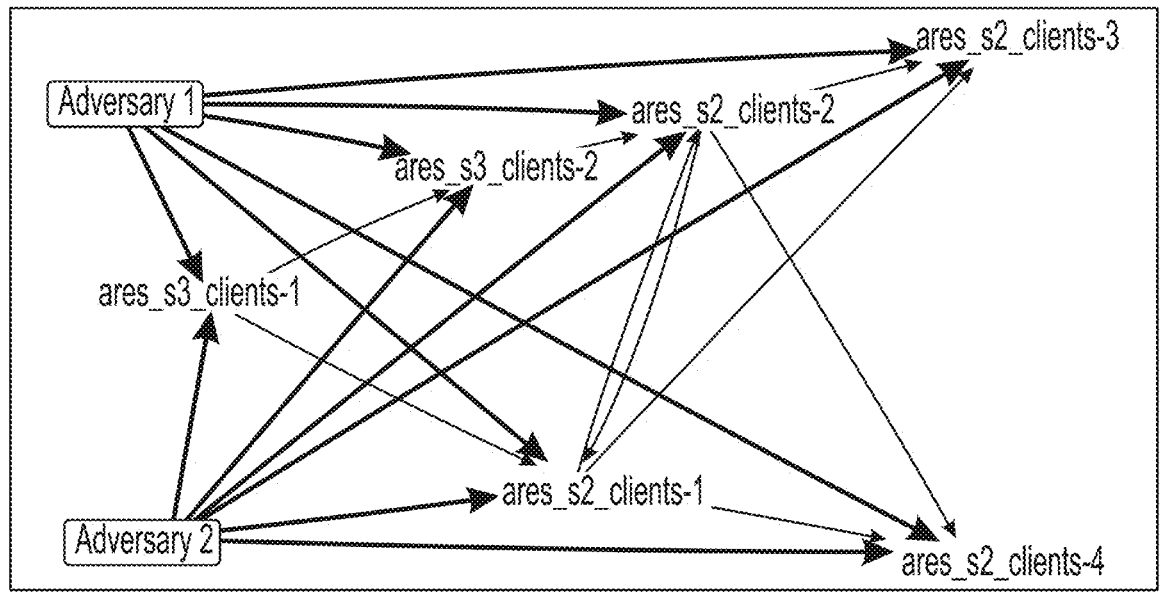

FIGS. 23A-23F illustrate different optimal security policies based on different weights assigned to objectives or sub-objectives. As shown in FIG. 23A, when mission accessibility (sub-objective O3.2) is assigned a weight of 100 and the adversary effort (sub-objective O3.1) is assigned a weight of 0, the policy may allow all edges, since blocking an edge may make the organizational mission unavailable. A weight of 0 for the adversary effort sub-objective O3.1 means there is no adversary effort, so no edges would need to be blocked.

In some embodiments, less emphasis may be placed on mission accessibility when, e.g., a threat becomes more severe. In some embodiments, more emphasis may be placed on maximizing adversary effort, resulting in more blocked edges. There may be an optimal tradeoff for a given relative weighting between mission accessibility and security/adversary effort. In some embodiments, the system may preferentially select blocking those edges that support shorter exploitation paths (from attack start host to attack goal host) and lower mission criticality over other edges. For example, compare FIG. 23E, where the mission accessibility sub-objective O3.2 is assigned a weight of 25, to FIG. 23B, where the mission accessibility sub-objective O3.2 is assigned a weight of 75. The number of blocked paths may be greater when the mission accessibility sub-objective O3.2 has a lower weight (compared to when the mission accessibility sub-objective O3.2 has a higher weight). In some embodiments, the number of blocked paths may be greater when the adversary effort sub-objective O3.1 is assigned a higher weight (compared to when the adversary effort sub-objective O3.1 has a lower weight).

Figure 23F:
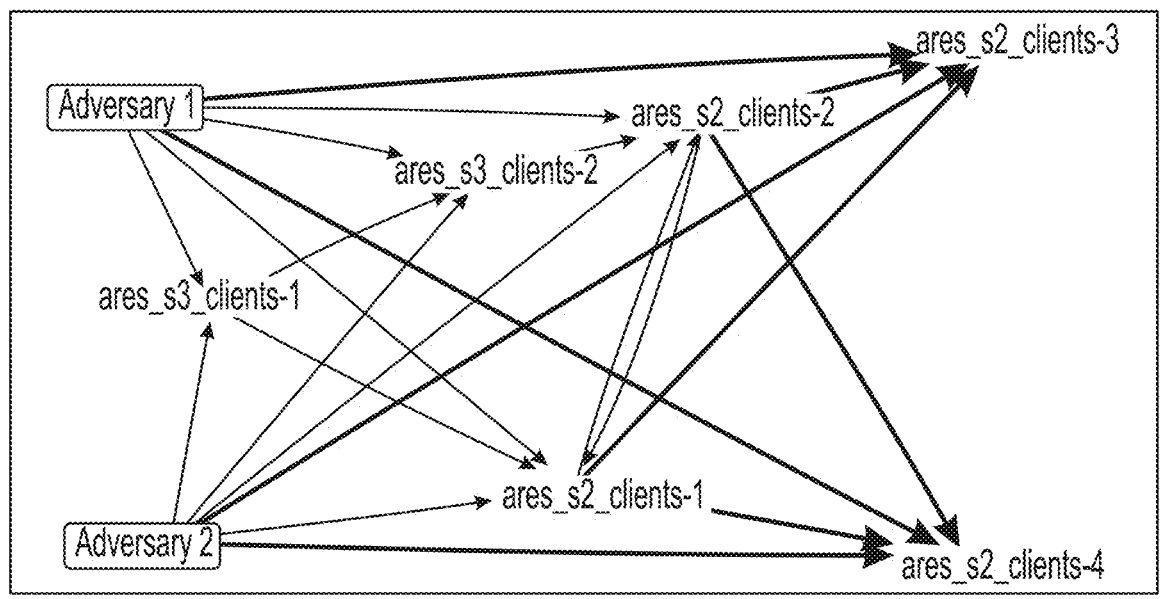

As shown in FIG. 23F, when mission accessibility (sub-objective O3.2) is assigned a weight of 0 and the adversary effort (sub-objective O3.1) is assigned a weight of 100, the policy may block all edges from the attack start hosts to the attack goal host, since the mission accessibility may have no impact on policy optimization.

Figure 24:
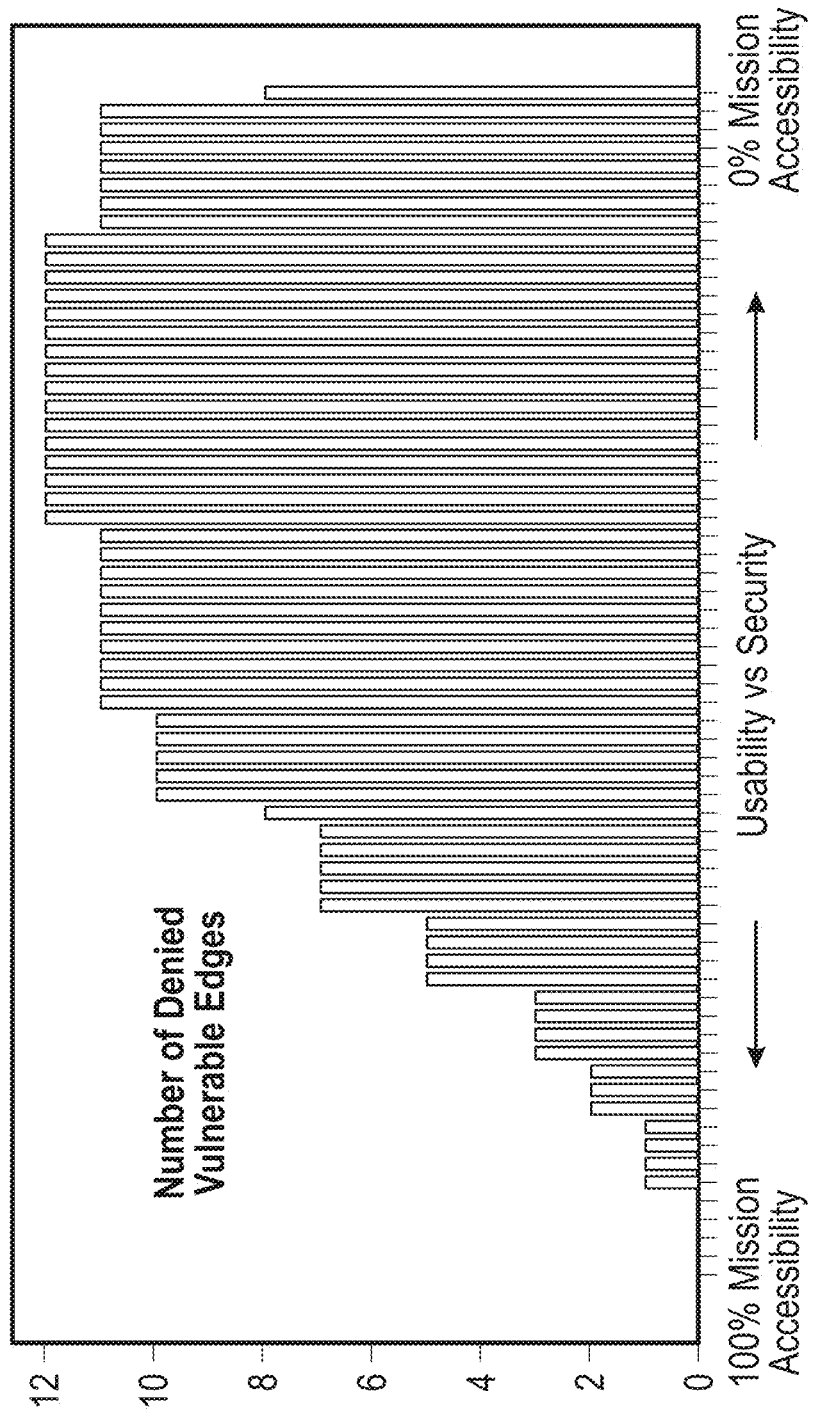
FIG. 24 illustrates an exemplary plot of a number of denied vulnerable edges for different mission accessibility weights, according to some embodiments of the disclosure.

FIG. 24 illustrates an exemplary plot of number of denied vulnerable edges for different mission accessibility weights, according to some embodiments of the disclosure. The number of denied vulnerable edges may be determined using the genetic algorithm (discussed above). In some embodiments, different mission accessibility weights may have different adversary effort weights. As shown in the figure, the system may determine different optimal solutions depending on the objective weights. In some embodiments, the system may choose among the multiple optimal solutions depending on the fitness function relative to a particular threshold value.

Figure 25:
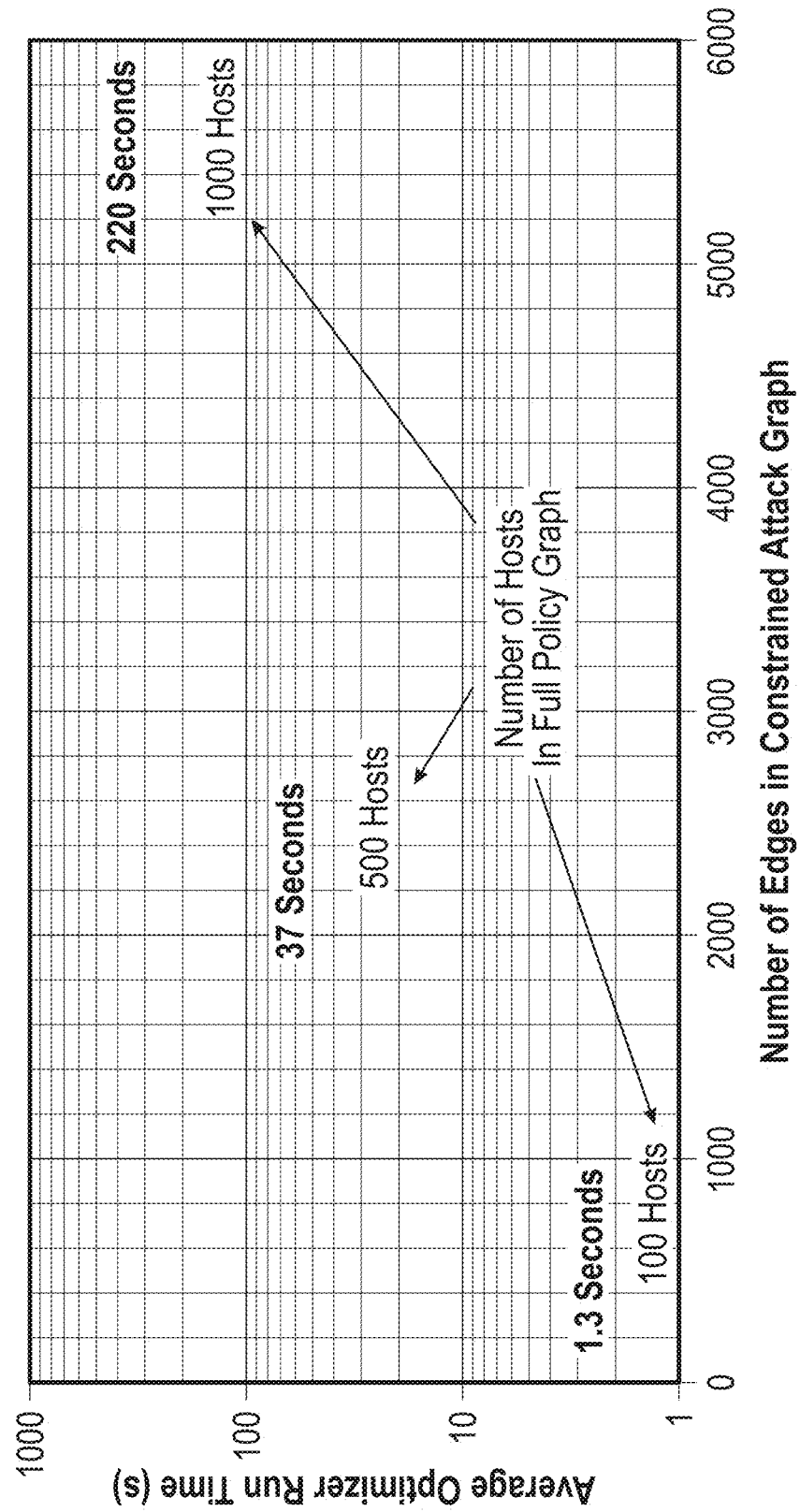
FIG. 25 illustrates an exemplary plot of run times for microsegmentation policy optimization for networks of various sizes, according to some embodiments of the disclosure.

FIG. 25 illustrates an exemplary plot of run times for the disclosed microsegmentation policy optimization for networks of various sizes, according to some embodiments of the disclosure. The data for each network may be synthesized using a generative model that learns statistical distributions of data. The generative model may be used to generate datasets of arbitrary scale for performance testing. In the example shown in FIG. 25, the number of hosts is equal to 74, but this number is not limiting.

Figure 26B:
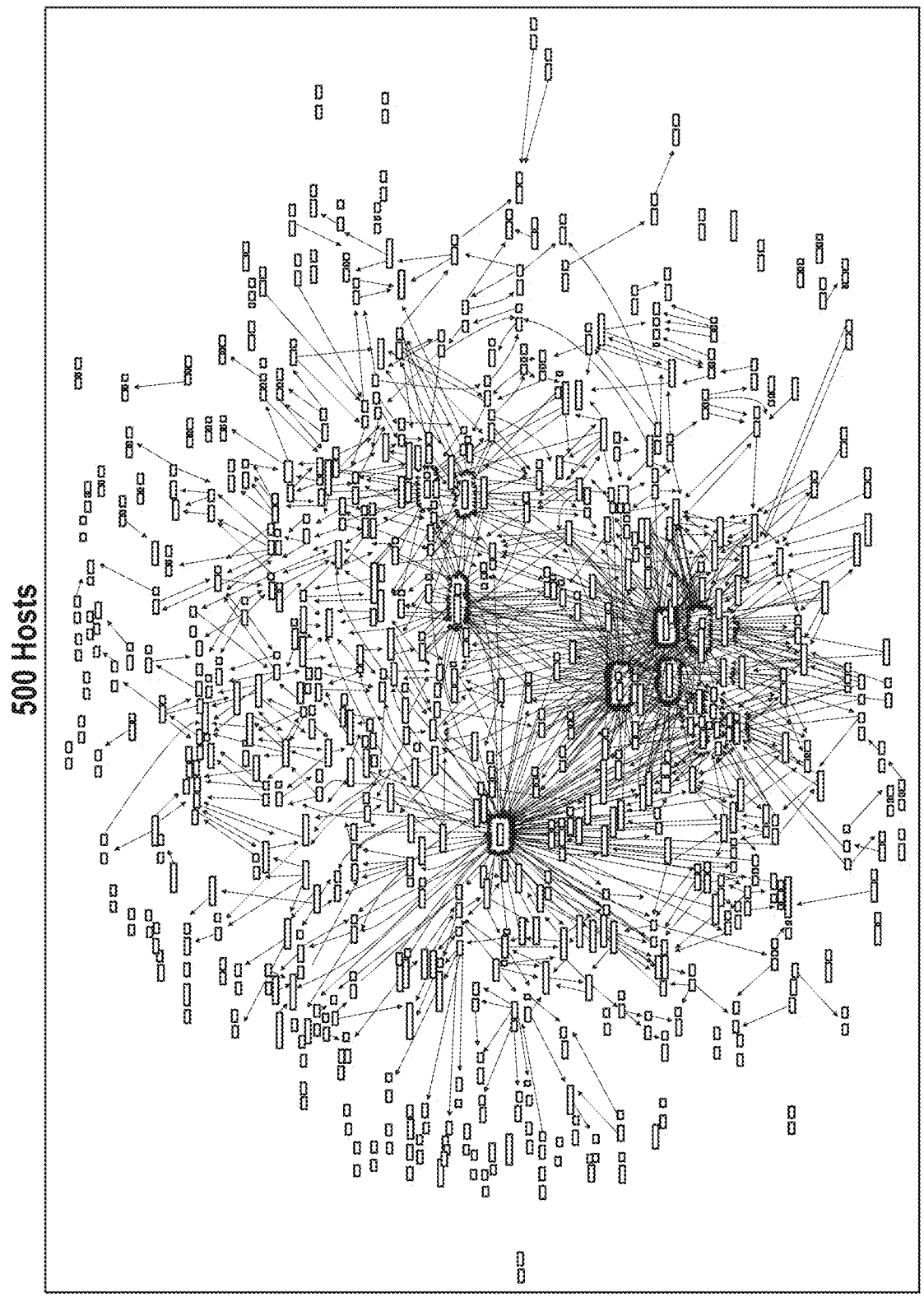
Figure 26C:
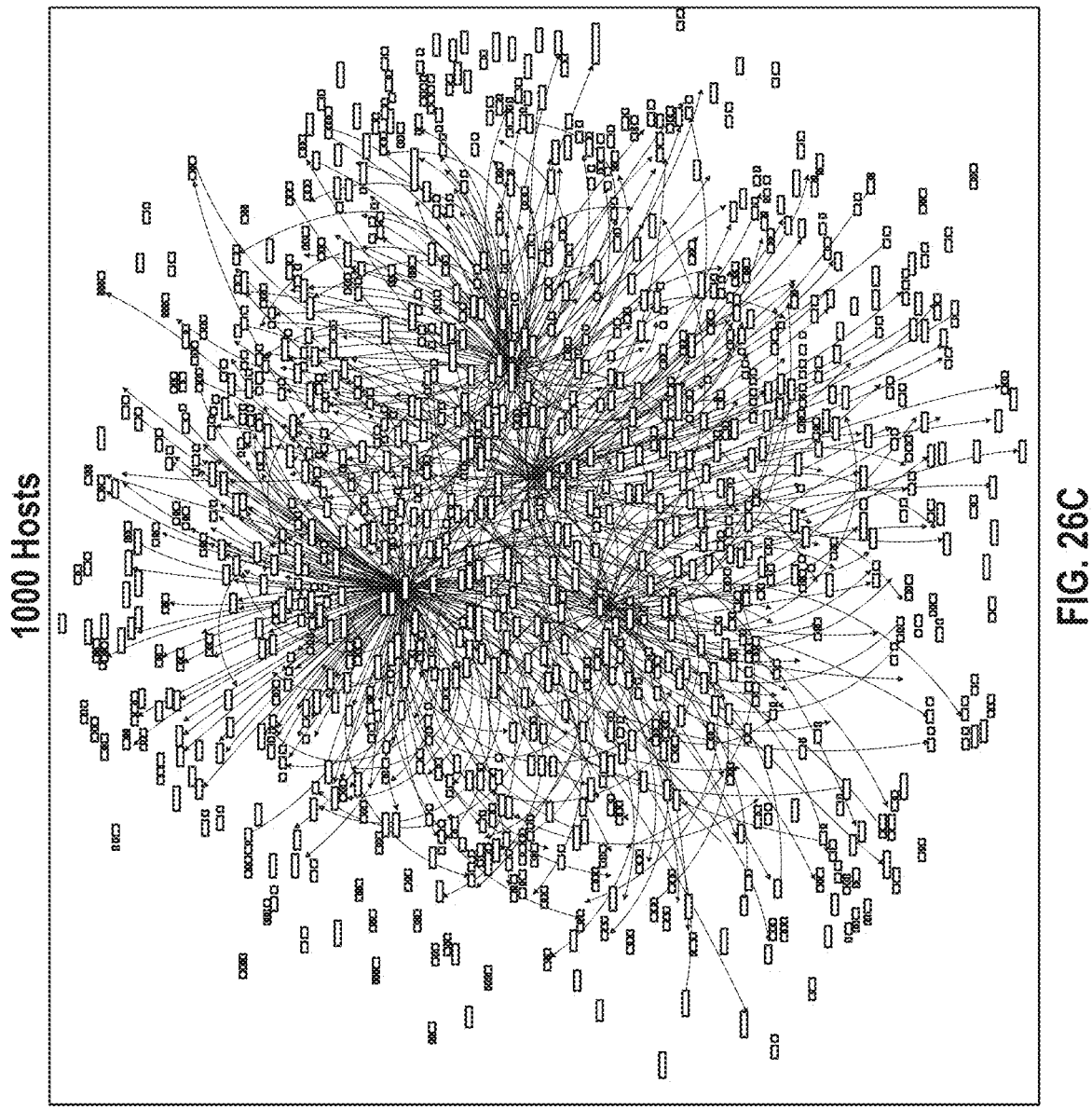

FIGS. 26A-26C illustrates exemplary traffic flows for a plurality of synthesized network datasets input into the microsegmentation policy optimization using the run times shown in FIG. 25.

Exemplary System for Microsegmentation Policy Optimization

Figure 27:
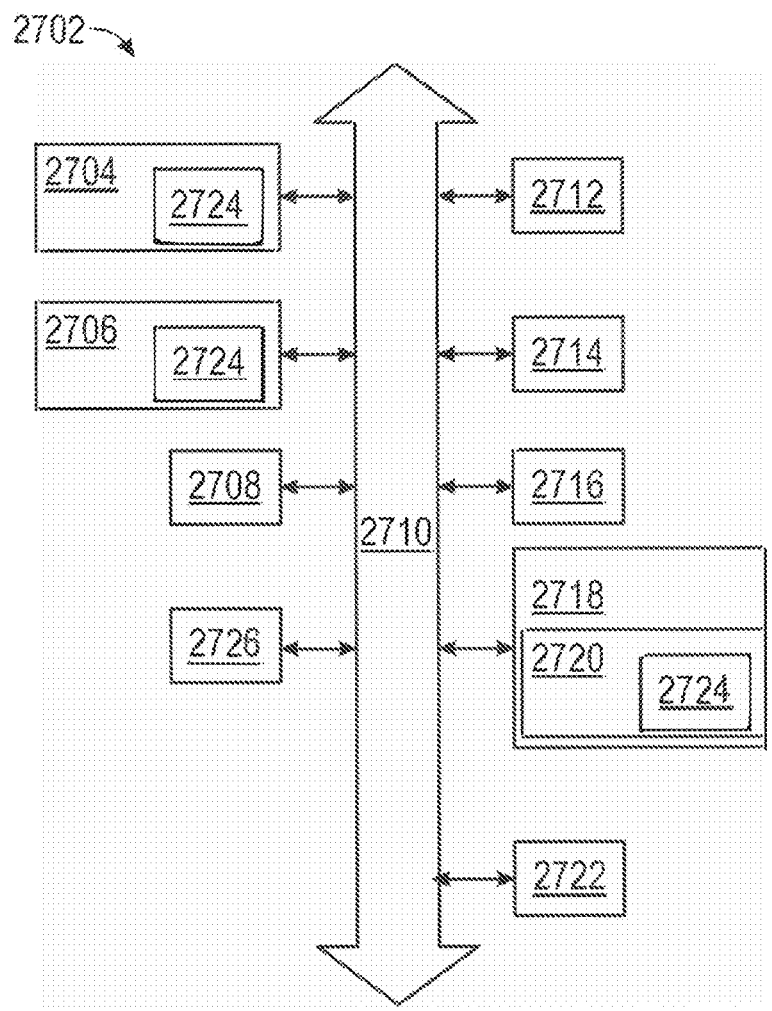
FIG. 27 illustrates a block diagram of an exemplary system, according to some embodiments of the disclosure.

The microsegmentation policy optimization discussed above may be implemented by a system. FIG. 27 illustrates a block diagram of an exemplary system 2702, according to some embodiments of the disclosure. The system may be a machine such as a computer, within which a set of instructions, causes the machine to perform any one of the steps and processes discussed herein, according to some embodiments of the disclosure. In some embodiments, the machine can operate as a standalone device or may be connected (e.g., networked) to other machines. In a networked configuration, the machine may operate in the capacity of a server or a client machine in a server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, a switch or bridge, or any machine capable of executing a set of instructions (sequential or otherwise) that specify actions to be taken by that machine. A mobile device such as a PDA or a cellular phone may also include an antenna, a chip for sending and receiving radio frequency transmissions and communicating over cellular phone WAP and SMS networks, and a built-in keyboard. Further, while only a single machine is illustrated, the term "machine" shall also be taken to include any collection of machines that individually or jointly execute a set (or multiple sets) of instructions to perform any one of the methodologies discussed herein.

The exemplary computer 2702 includes a processor 2704 (e.g., a central processing unit (CPU), a graphics processing unit (GPU), or both), a main memory 2706 (e.g., read-only memory (ROM), flash memory, dynamic random access memory (DRAM) such as synchronous DRAM (SDRAM) or Rambus DRAM (RDRAM), etc.), and a static memory 2708 (e.g., flash memory, static random access memory (SRAM), etc.), which can communicate with each other via a bus 2710.

The computer 2702 may further include a video display 2712 (e.g., a liquid crystal display (LCD) or a cathode ray tube (CRT)). The computer 2702 also includes an alphanumeric input device 2714 (e.g., a keyboard), a cursor control device 2716 (e.g., a mouse), a disk drive unit 2718, a signal generation device 2726 (e.g., a speaker), and a network interface device 2722.

The drive unit 2718 includes a machine-readable medium 2720 on which is stored one or more sets of instructions 2724 (e.g., software) embodying any one or more of the methodologies or functions described herein. The software may also reside, completely or at least partially, within the main memory 2706 and/or within the processor 2704 during execution thereof by the computer 2702, the main memory 2706 and the processor 2704 also constituting machine-readable media. The software may further be transmitted or received over a network 2704 via the network interface device 2722.

While the machine-readable medium 2720 is shown in an exemplary embodiment to be a single medium, the term "non-transitory computer-readable medium" should be taken to include a single medium or multiple media (e.g., a centralized or distributed database and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A method for providing a security access-control policy to a network, the method comprising:
   defining a model, the model including a plurality of matrices, the plurality of matrices comprising:
     an attack matrix representing an attacker's accessibility within the network,
     a mission matrix representing one or more mission availability needs, and
     a policy rule matrix representing candidate security policy rules;
   determining one or more objectives and one or more constraints, the one or more objectives being one or more variables that enhance accessibility to network resources and reduce cyberattack risks, and the one or more constraints being one or more variables that characterize resource limitations or minimum mission availability requirements within a network environment;
   forming an optimization problem using the one or more objectives and the one or more constraints; and
   solving the optimization problem comprising:
     determining one or more candidate security policies using the plurality of matrices in the model, wherein the one or more candidate security policies meet the one or more constraints,
     determining a score for each of the one or more candidate security policies in meeting the one or more objectives,
     determining a highest score, and
     selecting the security access-control policy from the one or more candidate security policies, wherein the selection is determined from the one or more candidate security policies that has the highest score.

2. The method of claim 1, wherein the defining the model further comprises:
   determining a hardened attack matrix by applying the policy rule matrix to the attack matrix;
   determining a hardened mission matrix by applying the policy rule matrix to the mission matrix,
   wherein the optimization problem is formed using the hardened attack matrix and the hardened mission matrix.

3. The method of claim 1, wherein the one or more objectives comprise an objective to minimize a number of blocked edges in the model.

4. The method of claim 1, wherein the one or more objectives comprise a sub-objective, the sub-objective is to minimize a total weight of one or more blocked mission edges between host pairs in the mission matrix.

5. The method of claim 1, wherein the determining the one or more candidate security policies comprises finding paths in the attack matrix and corresponding paths in the mission matrix.

6. The method of claim 1, further comprising:
   forming an additional optimization problem using one or more additional objectives, wherein the one or more additional objectives comprise an objective to maximize a number of blocked shortest attack paths in the attack matrix.

7. The method of claim 6, wherein the blocked shortest attack paths are from one or more attack start hosts to one or more attack goal hosts.

8. The method of claim 6, wherein an objective of the one or more additional objectives comprises a plurality of sub-objectives, the plurality of sub-objectives includes a sub-objective to minimize a number of blocked edges in the mission matrix.

9. The method of claim 6, wherein an objective of the one or more additional objectives comprises a plurality of sub-objectives, the plurality of sub-objectives includes a first sub-objective, a second sub-objective, and a third sub-objective, wherein the first sub-objective has a first priority, the second sub-objective has a second priority, and the third sub-objective has a third priority, wherein the first priority is higher than the second priority, and the second priority is higher than the third priority.

10. The method of claim 9, wherein the security access-control policy is selected from the sub-objective having both the highest score and the highest priority.

11. The method of claim 1, wherein the security access-control policy is selected from the objective having the highest score.

12. The method of claim 1, further comprising:
forming an additional optimization problem using one or more additional constraints or objectives, wherein the one or more additional constraints or objectives comprise a constraint or an objective to keep a mission impact within a predetermined budget.

13. The method of claim 1, wherein the plurality of matrices have corresponding plurality of graphs, and edges in the plurality of graphs are assigned weights.

14. A non-transitory computer readable medium, the computer readable medium including instructions that, when executed, perform a method for providing a security access-control policy to a network, the method comprising:
defining a model, the model including a plurality of matrices, the plurality of matrices comprising:
an attack matrix representing an attacker's accessibility within the network,
a mission matrix representing one or more mission availability need, and
a policy rule matrix representing candidate security policy rules;
determining one or more objectives and one or more constraints, the one or more objectives being one or more variables that enhance accessibility to network resources and reduce cyberattack risks, and the one or more constraints being one or more variables that characterize resource limitations or minimum mission availability requirements within a network environment;
forming an optimization problem using the one or more objectives and the one or more constraints; and
solving the optimization problem comprising:
determining one or more candidate security policies using the plurality of matrices in the model, wherein the one or more candidate security policies meet the one or more constraints,
determining a score for each of the one or more candidate security policies in meeting the one or more objectives,
determining a highest score, and
selecting the security access-control policy from the one or more candidate security policies, wherein the selection is determined from the one or more candidate security policies that has the highest score.

15. The non-transitory computer readable medium of claim 14, wherein the one or more objectives comprise a sub-objective, the sub-objective is to minimize a total weight of one or more blocked mission edges between host pairs in the mission matrix.

16. The non-transitory computer readable medium of claim 14, the method further comprising:
forming an additional optimization problem using one or more additional objectives, wherein the one or more additional objectives comprise an objective to maximize a number of blocked shortest attack paths in the attack matrix.

17. The non-transitory computer readable medium of claim 16, wherein an objective of the one or more additional objectives comprises a plurality of sub-objectives, the plurality of sub-objectives including a sub-objective to minimize a number of blocked edges in the mission matrix.

18. The non-transitory computer readable medium of claim 16, wherein an objective of the one or more additional objectives comprises a plurality of sub-objectives, the plurality of sub-objectives including a first sub-objective, a second sub-objective, and a third sub-objective, wherein the first sub-objective has a first priority, the second sub-objective has a second priority, and the third sub-objective has a third priority, wherein the first priority is higher than the second priority, and the second priority is higher than the third priority.

19. The non-transitory computer readable medium of claim 14, the method further comprising:
forming an additional optimization problem using one or more additional constraints or objectives, wherein the one or more additional constraints or the one or more additional objectives comprise a constraint or an objective to keep a mission impact within a predetermined budget.

20. The non-transitory computer readable medium of claim 14, wherein the plurality of matrices have corresponding plurality of graphs, and edges in the plurality of graphs are assigned weights.

* * * * *